US008396411B2

(12) United States Patent
Kim et al.

(10) Patent No.: US 8,396,411 B2
(45) Date of Patent: Mar. 12, 2013

(54) COMMUNICATION METHOD IN MOBILE COMMUNICATION SYSTEM

(75) Inventors: Hee Wook Kim, Daejeon (KR); Kun Seok Kang, Daejeon (KR); Do-Seob Ahn, Daejeon (KR); Ho Jin Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 476 days.

(21) Appl. No.: 12/744,840

(22) PCT Filed: Aug. 4, 2008

(86) PCT No.: PCT/KR2008/004527
§ 371 (c)(1),
(2), (4) Date: May 26, 2010

(87) PCT Pub. No.: WO2009/072727
PCT Pub. Date: Jun. 11, 2009

(65) Prior Publication Data
US 2010/0304668 A1 Dec. 2, 2010

(30) Foreign Application Priority Data
Dec. 4, 2007 (KR) .................. 10-2007-0124998

(51) Int. Cl.
H04W 4/20 (2009.01)
H04H 20/71 (2008.01)
(52) U.S. Cl. ..... 455/3.01; 455/3.02; 455/427; 455/12.1; 455/426.1; 455/414.1; 455/517
(58) Field of Classification Search .................. None
See application file for complete search history.

(56) References Cited

U.S. PATENT DOCUMENTS
4,009,345 A 2/1977 Flemming et al.
(Continued)

FOREIGN PATENT DOCUMENTS
KR 1020040080712 9/2004
KR 10-0542973 1/2006
(Continued)

OTHER PUBLICATIONS
Karabinis, Peter D. et al., "Recent Advances that May Revitalize Mobile Satellite Systems," ASMS-TF (2003).
(Continued)

*Primary Examiner* — Philip Sobutka
(74) *Attorney, Agent, or Firm* — Nelson Mullins Riley & Scarborough LLP; EuiHoon Lee, Esq.

(57) ABSTRACT

The present invention relates to a communication method in a mobile communication system. An exemplary embodiment of the present invention provides a mobile satellite communication system having a complementary terrestrial component among various mobile communication systems. The mobile satellite communication system can simultaneously provide a communication service and a broadcasting service to a terminal according to integration between communication and broadcasting. Different signal transmission methods are used between the complementary terrestrial component and a satellite. Specifically, a time division duplex method and a frequency division duplex method are used together and resources are allocated. As a result, system throughput can be increased, and local broadcasting contents can be effectively transmitted to the terminal.

17 Claims, 15 Drawing Sheets

U.S. PATENT DOCUMENTS

| | | | |
|---|---|---|---|
| 5,363,374 A | 11/1994 | Zein Al Abedeen et al. | |
| 5,937,332 A | 8/1999 | Karabinis | |
| 6,411,609 B1 * | 6/2002 | Emmons et al. | 455/12.1 X |
| 6,985,458 B2 | 1/2006 | Freedman et al. | |
| 2005/0282542 A1 | 12/2005 | Karabinis | |
| 2006/0135060 A1 | 6/2006 | Karabinis | |
| 2006/0136549 A1 | 6/2006 | Carro | |
| 2006/0194536 A1 * | 8/2006 | Kim et al. | 455/3.02 |

FOREIGN PATENT DOCUMENTS

| | | |
|---|---|---|
| KR | 1020060005372 | 1/2006 |
| KR | 1020070009775 | 1/2007 |

OTHER PUBLICATIONS

Selier, Christophe et al., "Satellite Digital Multimedia Broadcasting (SDMB) system presentation," 1st Summit (2005).

* cited by examiner

[Fig. 1]
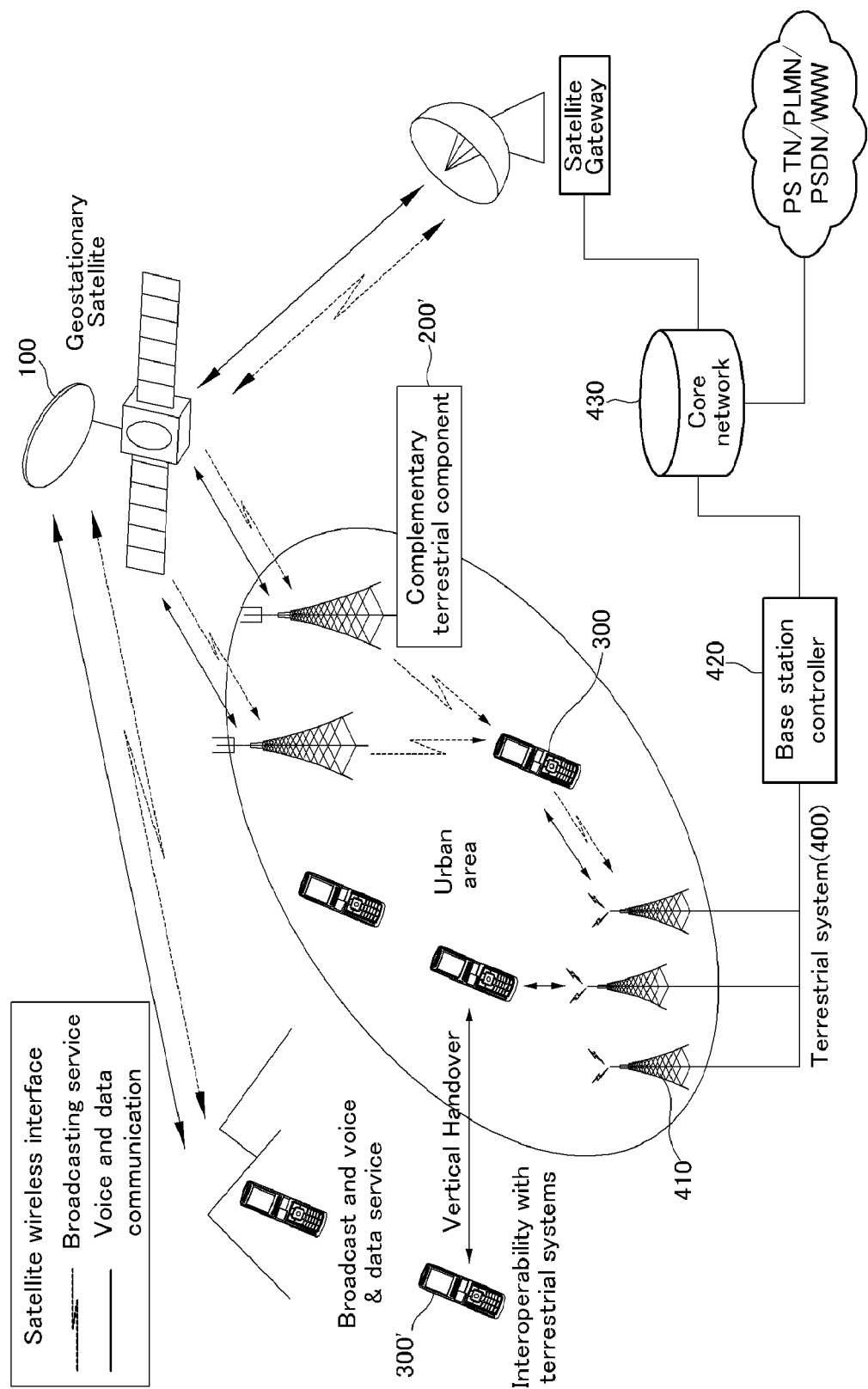

[Fig. 2]
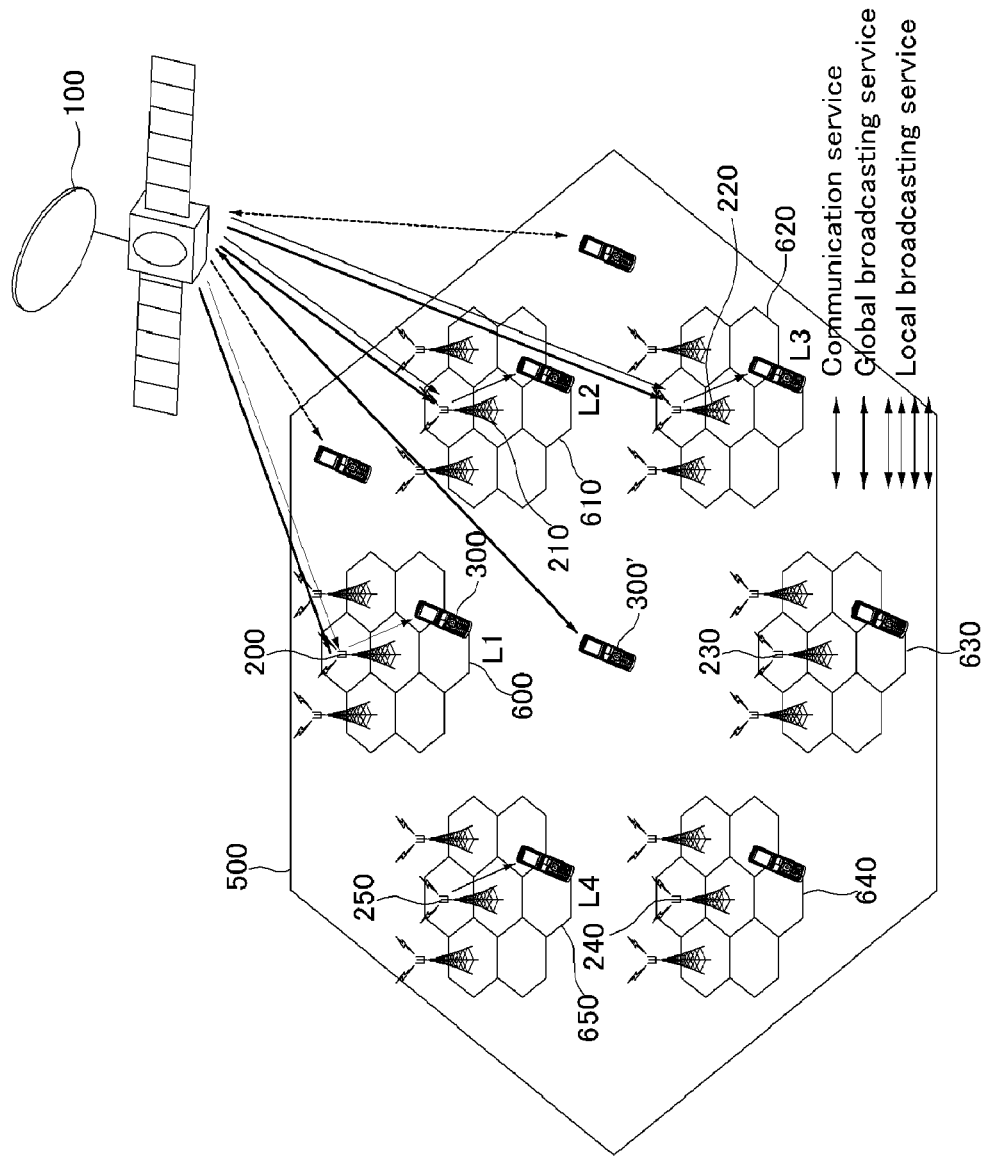
[Fig. 3]
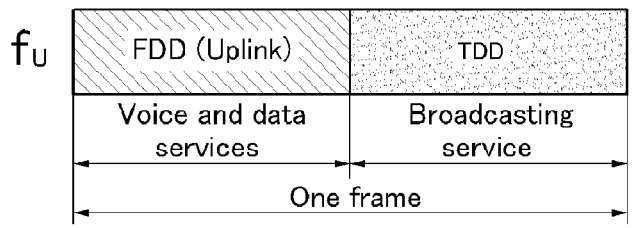

[Fig. 4]
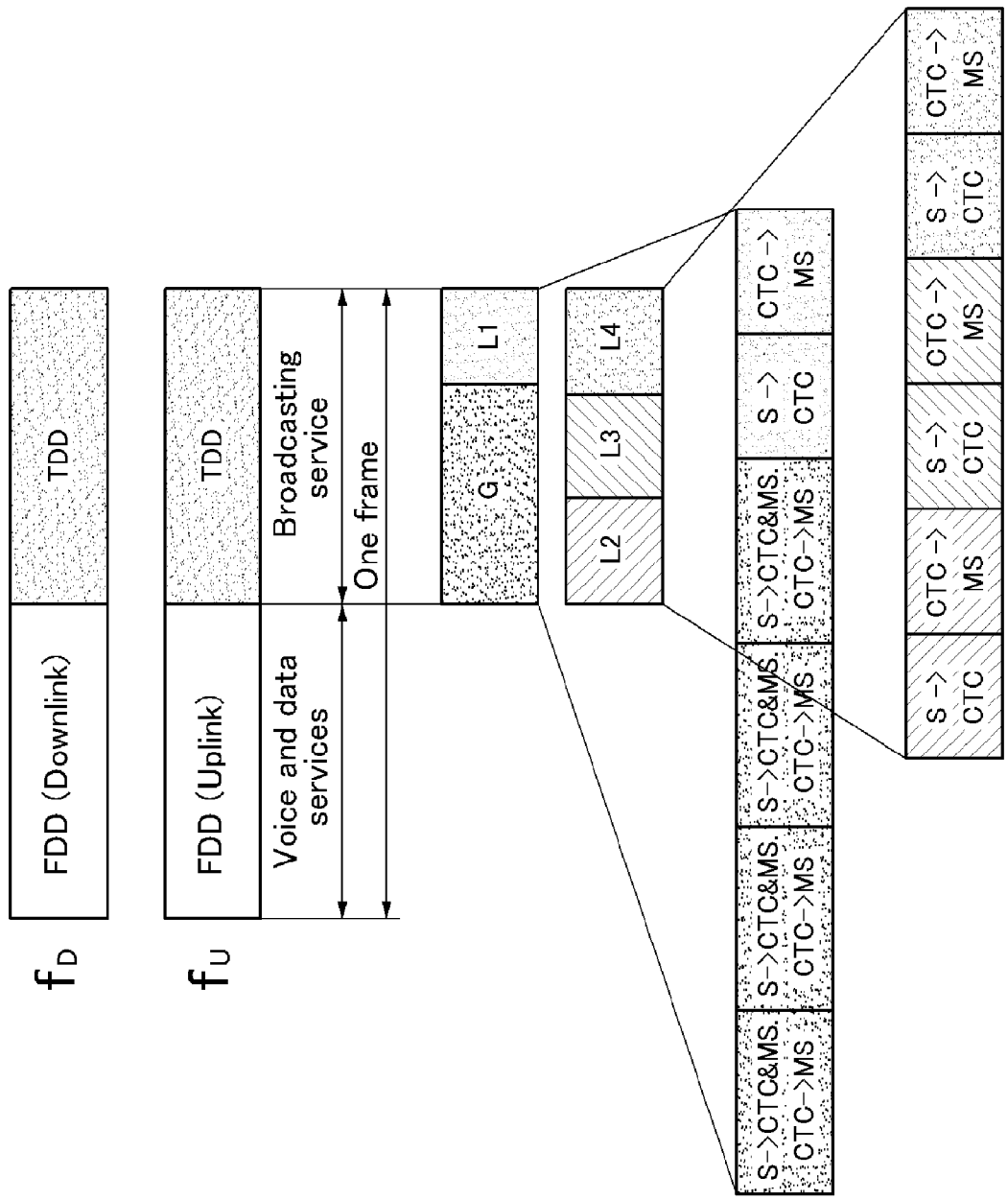

[Fig. 5]
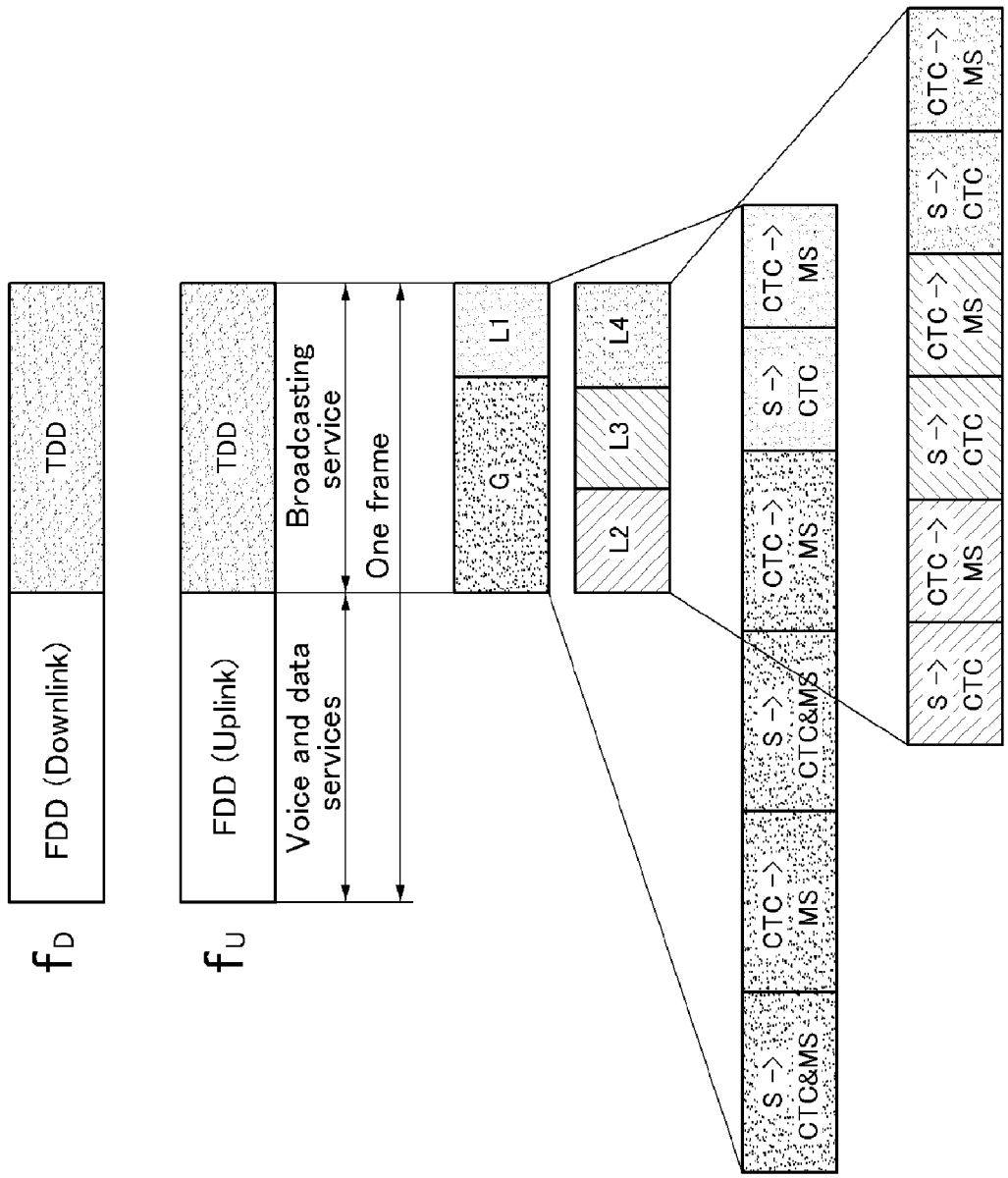

[Fig. 6]
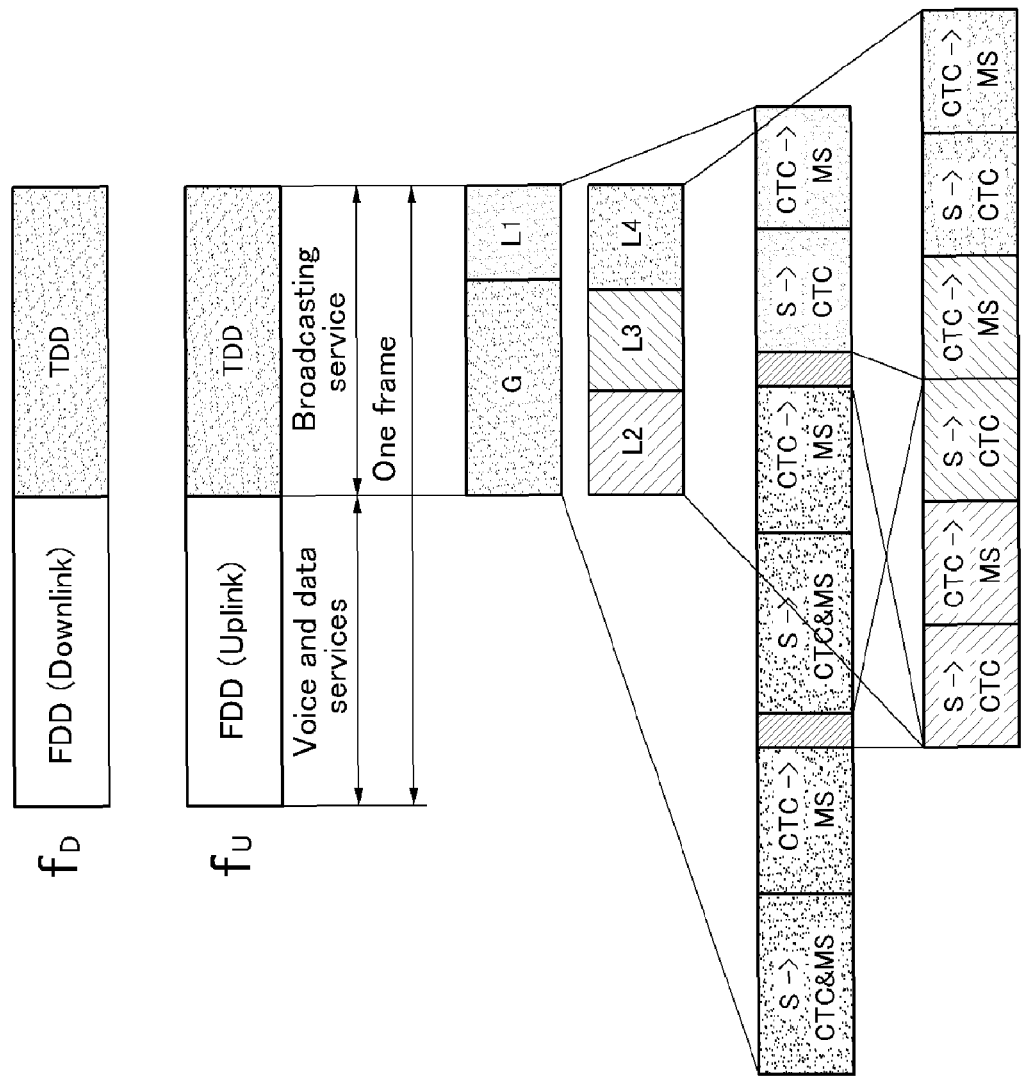

[Fig. 7]
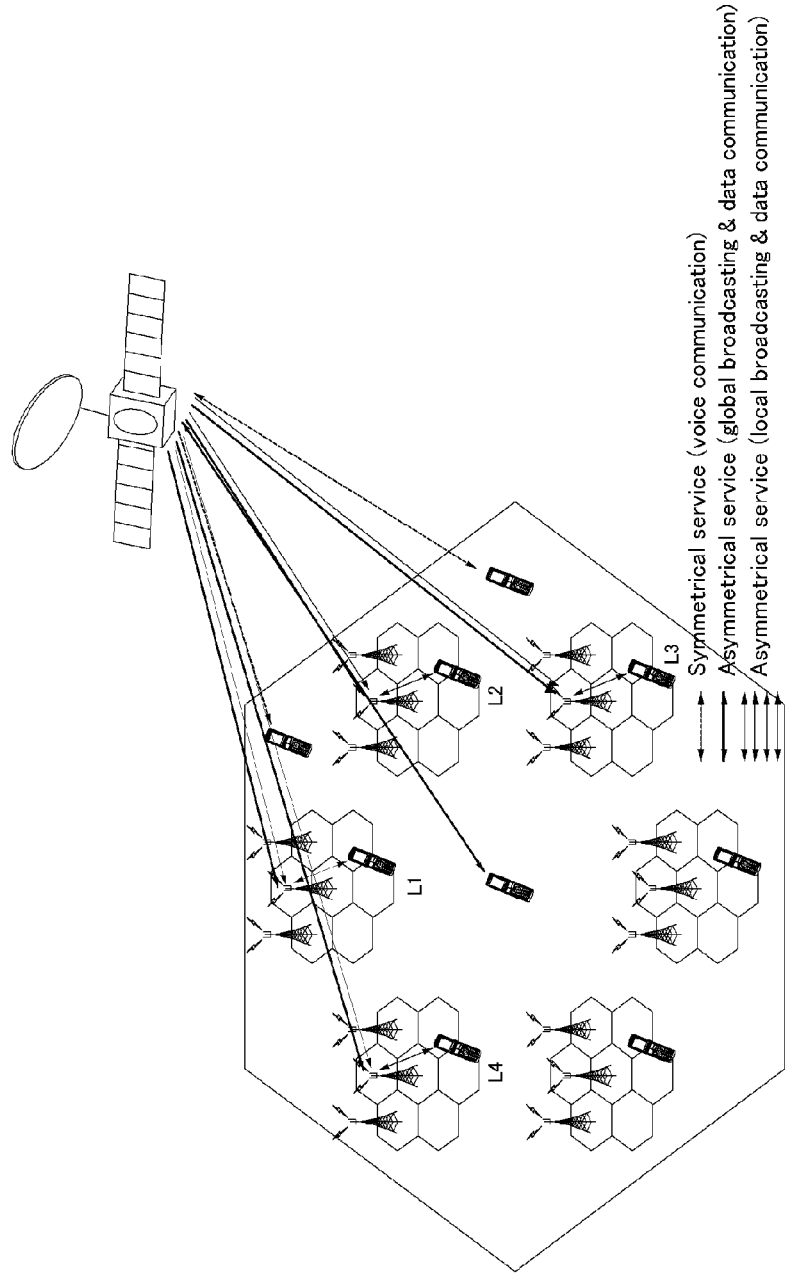
[Fig. 8]
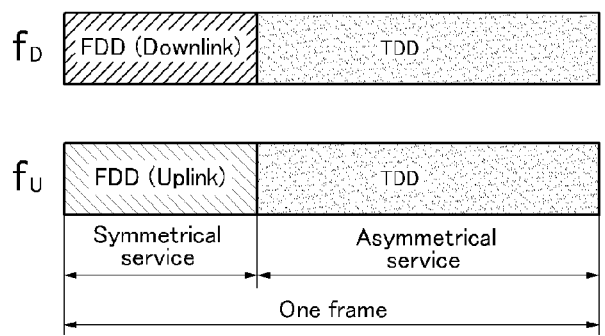

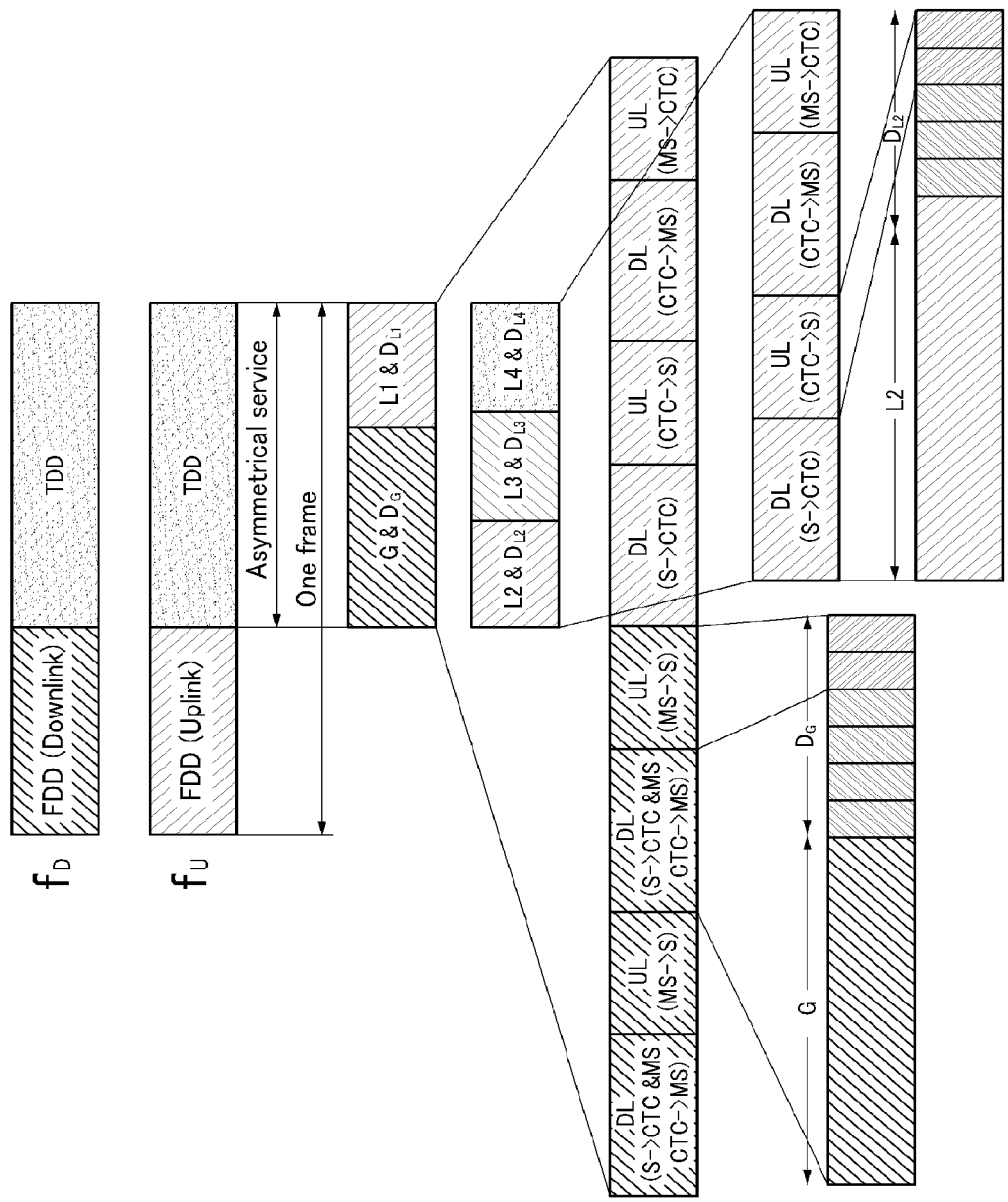
[Fig. 9]

[Fig. 10]
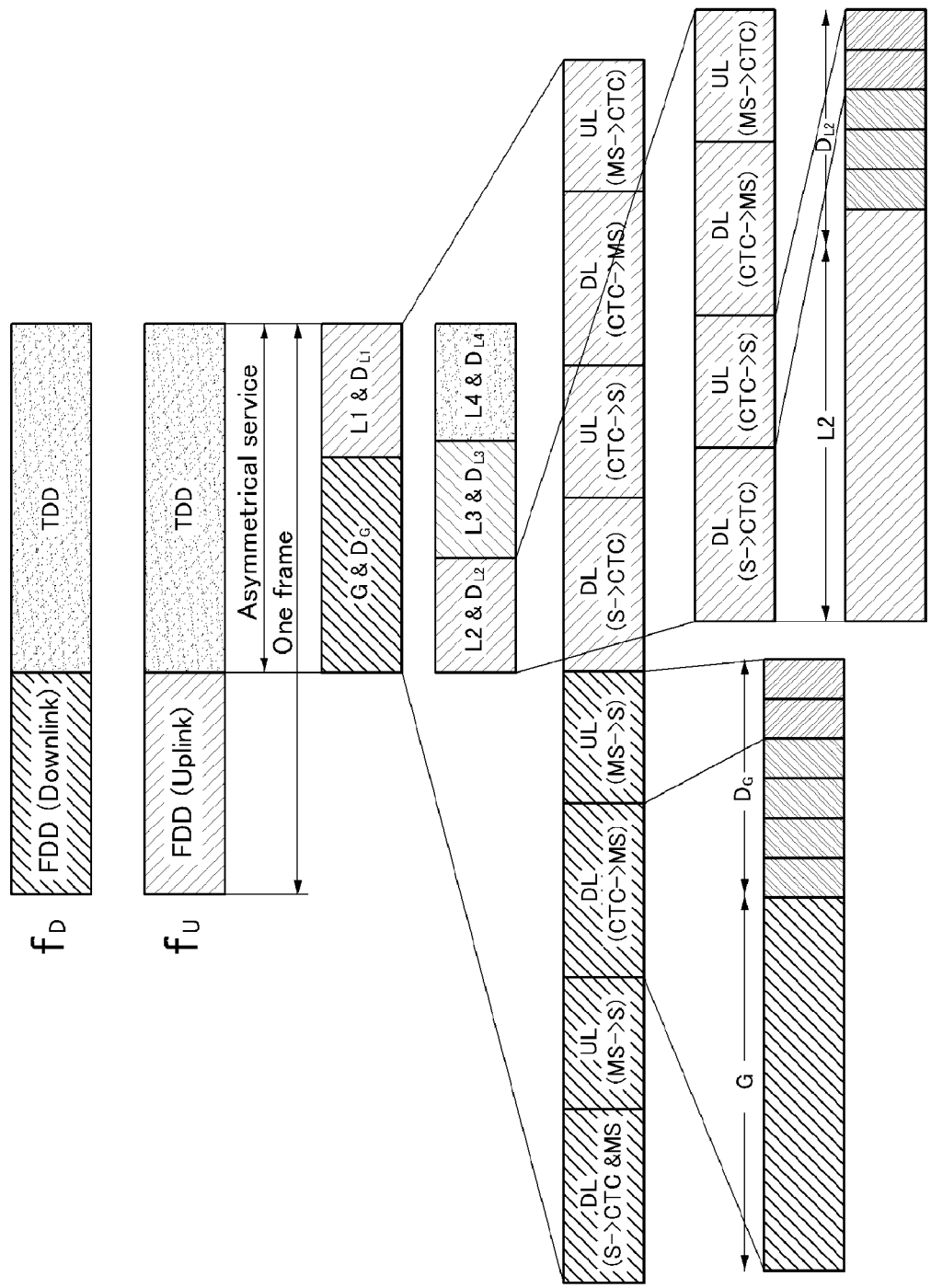

[Fig. 11]
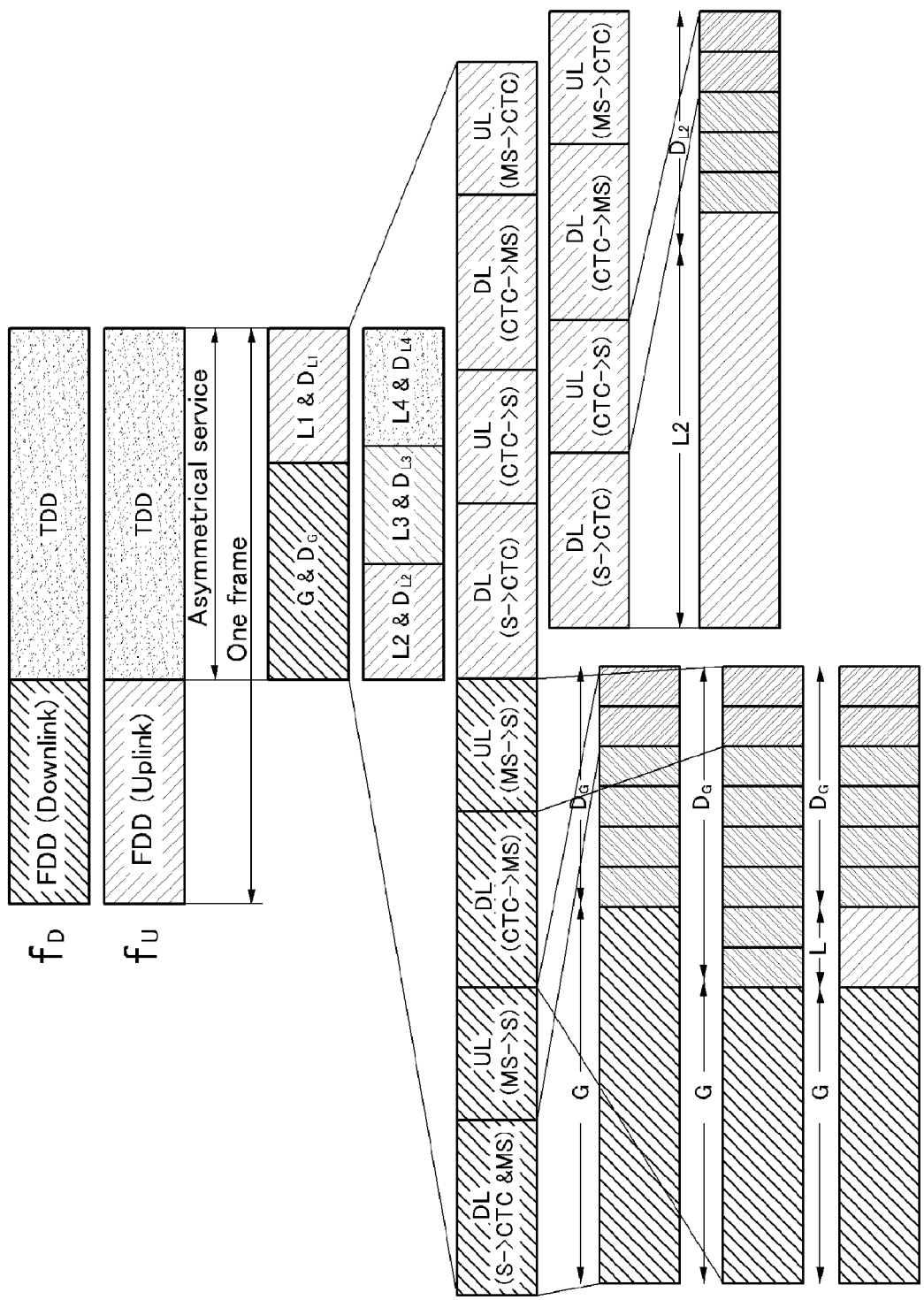

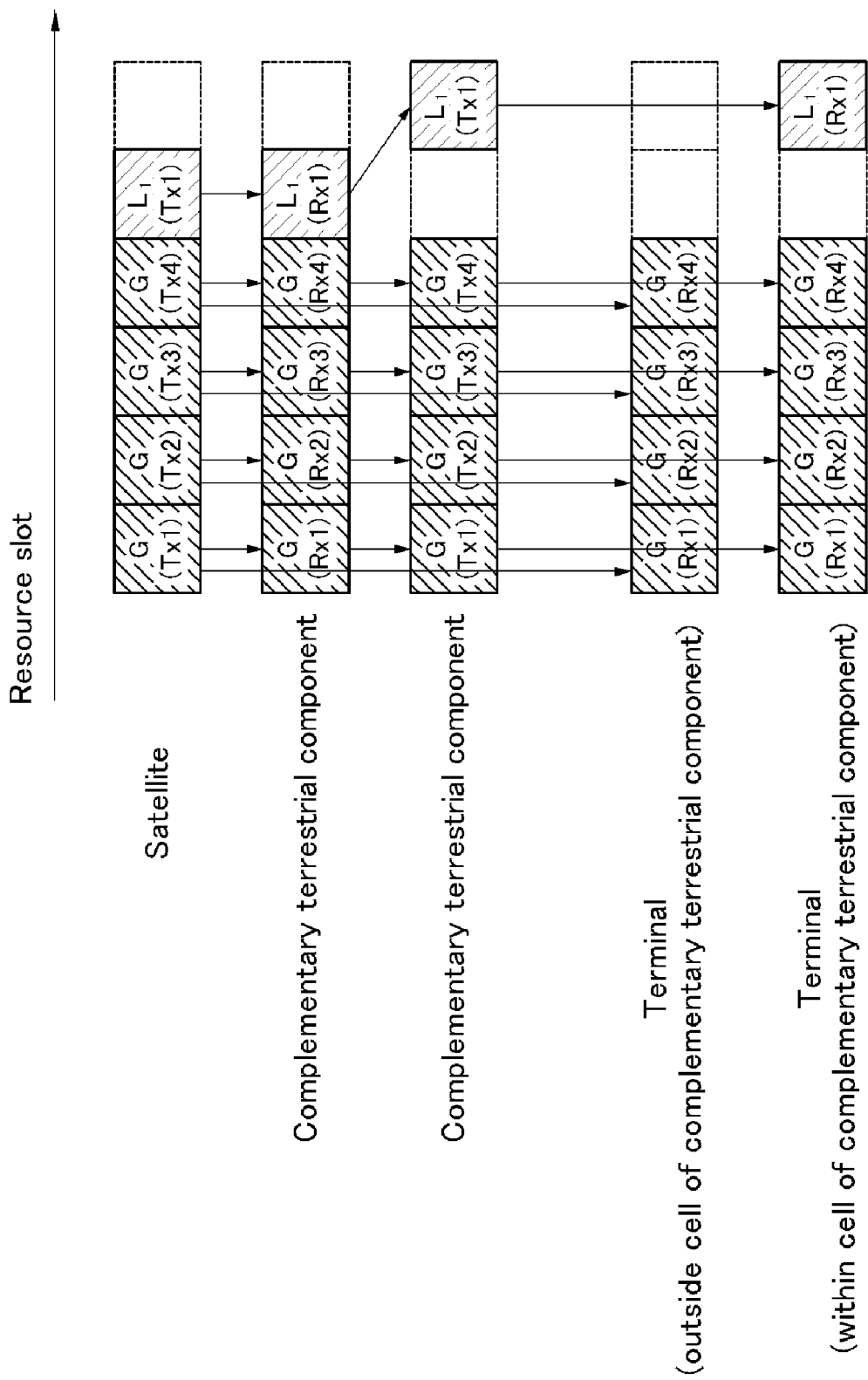
[Fig. 12]

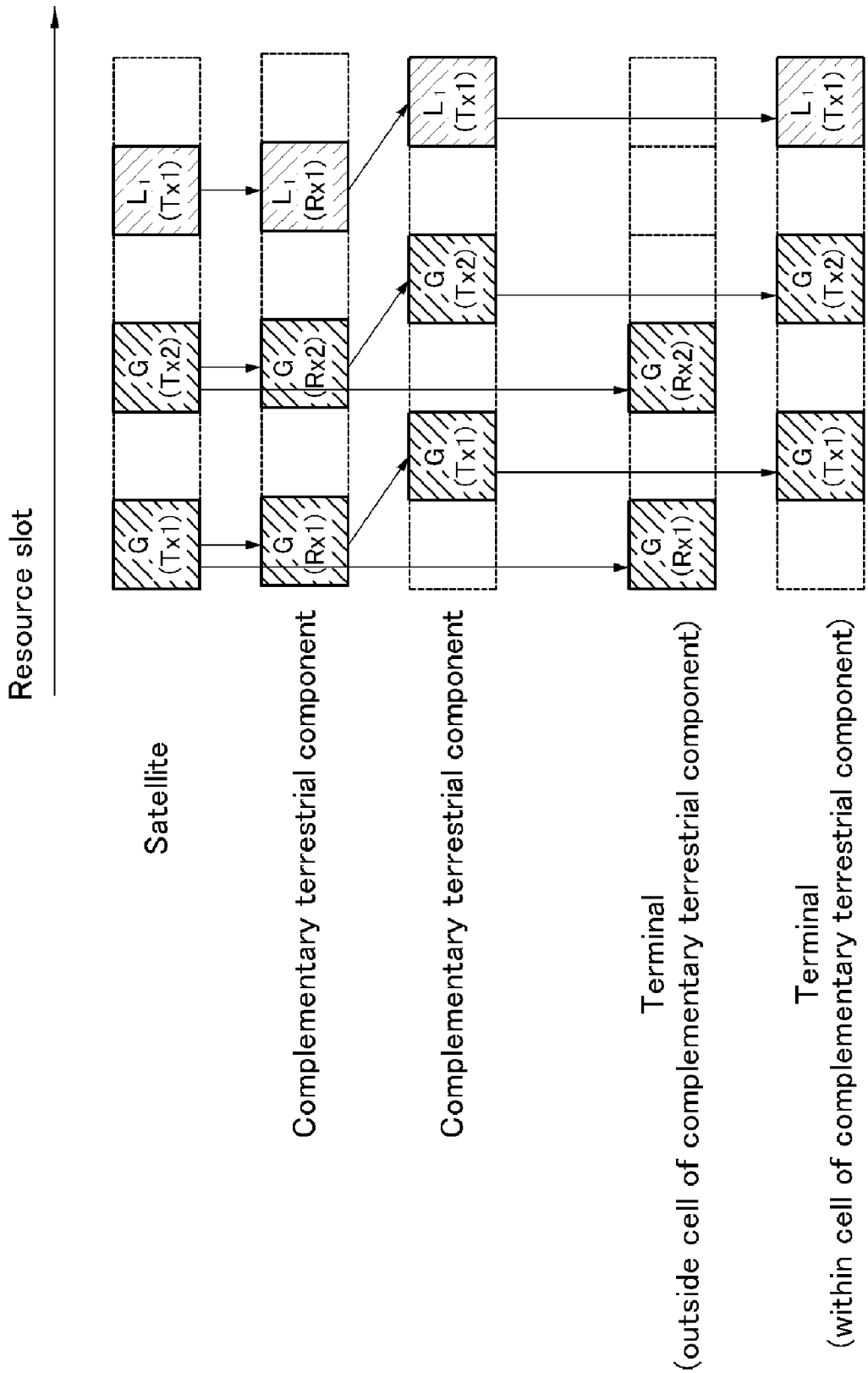
[Fig. 13]

[Fig. 14]
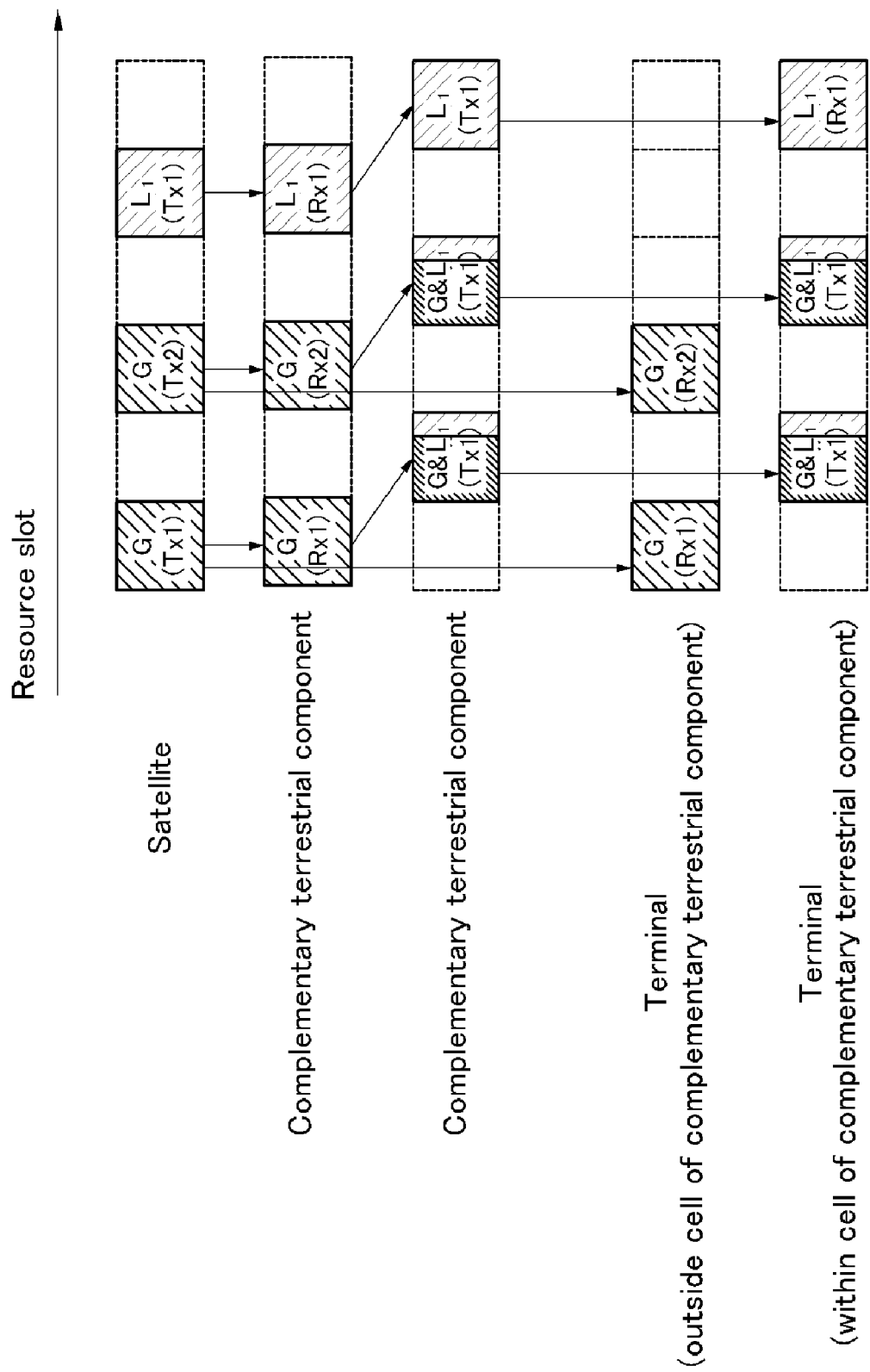

[Fig. 15]
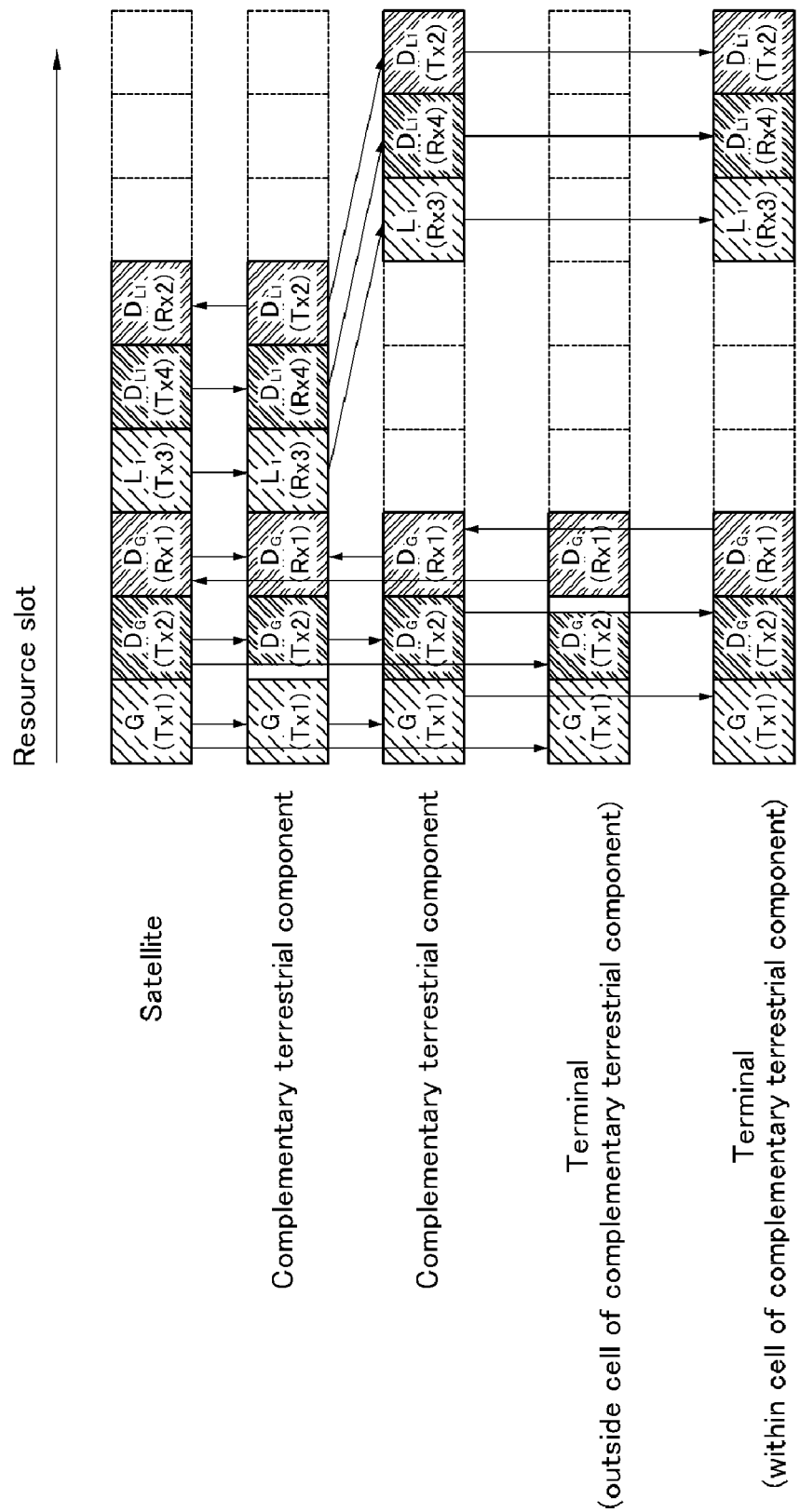

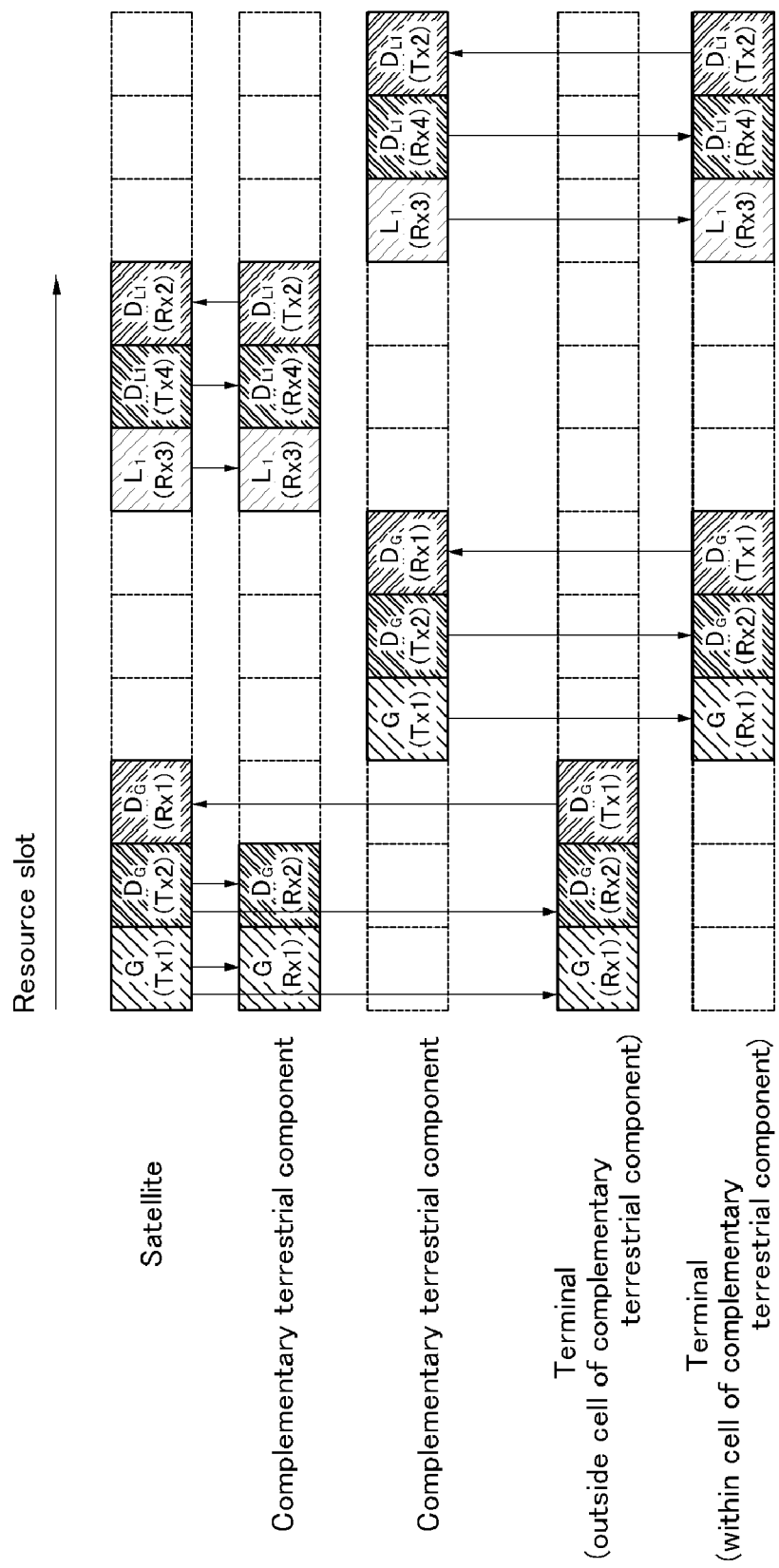
[Fig. 16]

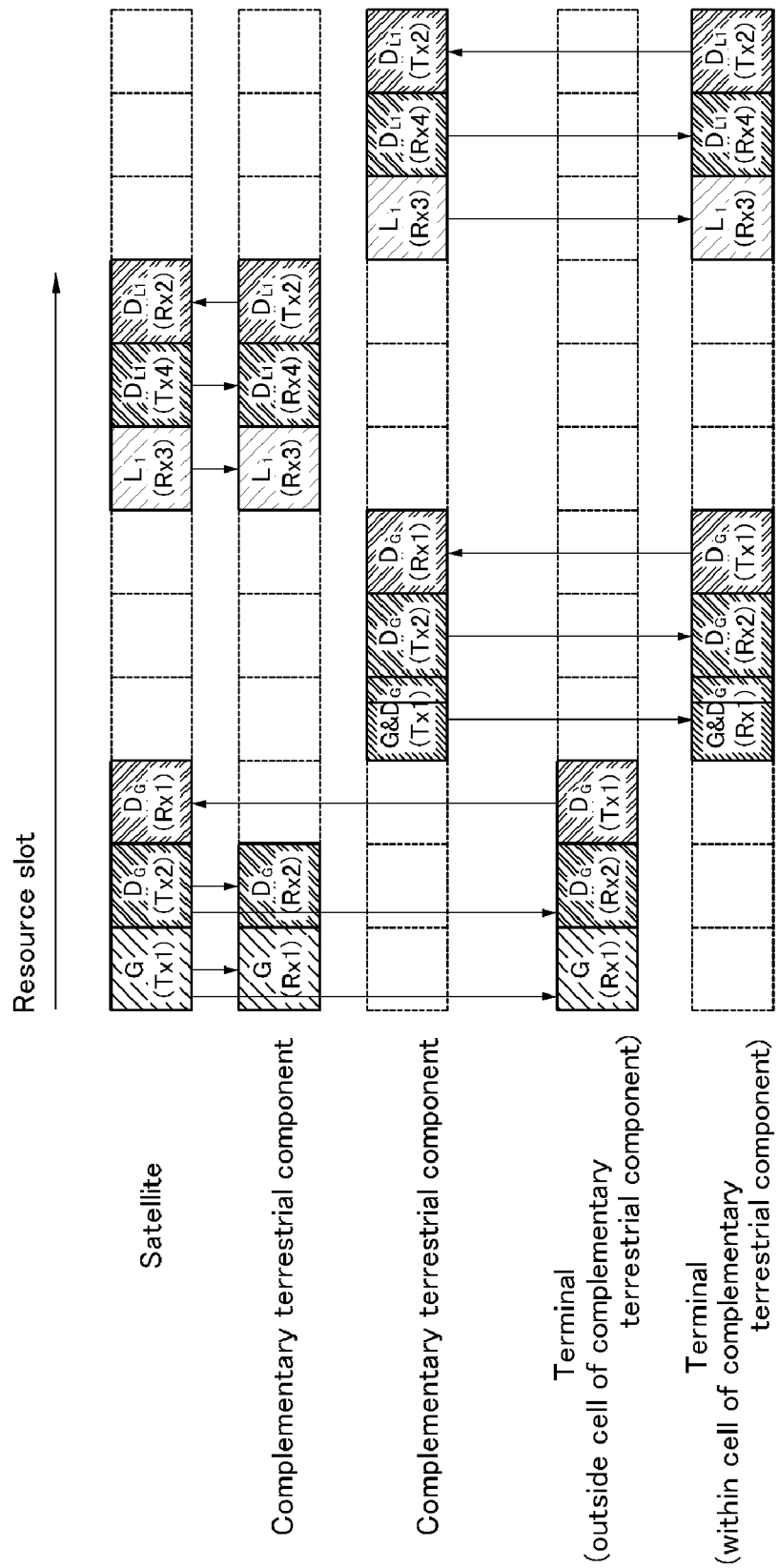
[Fig. 17]

COMMUNICATION METHOD IN MOBILE COMMUNICATION SYSTEM

RELATED APPLICATIONS

This application is a 35 U.S.C. §371 national stage filing of PCT Application No. PCT/KR2008/004527 filed on Aug. 4, 2008, which claims priority to, and the benefit of, Korean Patent Application No. 10-2007-0124998 filed on Dec. 4, 2007. The contents of the aforementioned applications are hereby incorporated by reference.

TECHNICAL FIELD

The present invention relates to a communication method in a mobile communication system.

The present invention was supported by the IT R&D program of MIC/IITA [2005-S-014-03, Development of Satellite IMT2000+ Technology].

BACKGROUND ART

In general, a satellite communication system uses complementary terrestrial components (CTC) such as repeaters, complementary ground components (CGC), or ancillary terrestrial components (ATC), to perform communication between a satellite and terminals. Examples of the satellite communication system include a satellite digital multimedia broadcasting (DMB) system, a digital video broadcasting—satellite services to handhelds (DVB-SH) system, and a geostationary orbit (GEO)-based mobile satellite communication system.

The satellite DMB system that already provides services additionally uses a terrestrial system that uses the same channel gap filler with a satellite and provides high-level audio and multimedia signals to a user that utilizes services. In this case, the same channel gap filler is used to effectively resolve a problem related to coverage in a shadow area. In order to provide these services, a frequency bandwidth used by a satellite and a frequency bandwidth used by a terrestrial system are optimized to a bandwidth in a range of 2630 to 2655 MHz.

The satellite DMB system includes a feeder link earth station, a satellite for broadcasting, a terrestrial repeater, and a terminal that receives services. A signal that is transmitted from the terminal is transmitted to the satellite through the feeder link earth station. At this time, for an uplink, a band (e.g., 14 GHz) for a fixed satellite service (FSS) is used. The satellite converts the received signal into a 2.6 GHz band signal, and the converted signal is amplified to have a predetermined magnitude by an amplifier in the repeater of the satellite and is broadcast to a terminal that is located in a service area.

It is required for the terminal to receive a signal transmitted from the satellite through a small antenna having low directivity. For this purpose, the terminal needs to have sufficient effective isotropic radiated power. Thus, the satellite needs to have a large transmitting antenna and a high-power repeater.

When the satellite transmits a 2.6 GHz band signal, a shadow problem occurs due to obstacles on a path from the satellite. In order to overcome this problem, at the time of designing a system, it is required to additionally provide a repeater that retransmits a satellite signal. The repeater allows the signal transmitted from the satellite to be transmitted to places where the signal cannot reach due to band obstacles, such as buildings. The repeater is divided into a direct amplification repeater and a frequency conversion repeater.

The direct amplification repeater only amplifies a 2.6 GHz band signal that is received from the satellite. The direct amplification repeater uses a low gain amplifier to prevent an unnecessary divergence from occurring due to signal interference between a receiving antenna and a transmitting antenna. The direct amplifier covers a small area at a distance of 500 m from the repeater on the basis of a line of sight (LoS).

Meanwhile, the frequency conversion repeater covers a large area at a distance of 3 km from the repeater, and converts a 2.6 GHz band signal transmitted from the satellite into another frequency band (e.g., 11 GHz) signal and transmits the converted signal to the terminal. In an environment where the two types of repeaters are needed, multipath fading occurs when two or more signals are received by the terminal.

As another example of the mobile satellite communication system, the DVB-SH system provides services to a terminal using a satellite for nationwide coverage, and services to the terminal using the CGC for an indoor environment and terrestrial coverage. The DVB-SH system provides a mobile TV service at a 15 MHz bandwidth of an S band on the basis of a DVB-H. In this case, the DVB-SH system uses a band near to a band used for terrestrial international mobile telecommunication (IMT) of an S band. Accordingly, integration with the terrestrial IMT and network reuse with a terrestrial system are easy, which results in decreasing installation costs.

The DVB-SH system considers a hybrid broadcasting structure with the terrestrial system. In order to resolve a signal interference problem between the satellite and the CGC and efficiently use a frequency, the DVB-SH system considers a structure in which a reuse factor is set to 1 with respect to a CGC cell in one satellite spot beam and to 3 with respect to the satellite spot beam. In this case, if using the satellite spot beam, 9 TV channels can be broadcast in nationwide coverage, and 27 channels can be broadcast through the terrestrial repeater in a downtown area or an indoor environment.

Finally, the GEO-based mobile satellite communication system has been developed in Mobile Satellite Ventures (MSV) and Terrestar in order to provide to a terminal a ubiquitous wireless broadband communication service such as an Internet access service and a voice conversation service in L and S bands. The GEO-based mobile satellite communication system uses a hybrid wireless network structure where the satellite and the ATC are coupled to each other and provides voice or high-speed packet services through the ATC, that is, a terrestrial system in a downtown area or congested area, and services through the satellite in the country or areas outside the downtown that are not covered by the ATC. Since the ATC uses a wireless interface such as the satellite, the GEO-based mobile satellite communication system has been developed such that satellite services can be provided without increasing complexity of the terminal.

All personal portable mobile satellite communication systems that will be developed use a satellite in the country or areas outside the downtown where a line of sight is secured are scheduled to provide services using a complementary terrestrial component, and using the complementary terrestrial component in the downtown area or an indoor environment where satellite signals are not secured. However, systems and signal transmission methods have been developed for the purpose of either a broadcasting service or a communication service, such as voice or data.

Thus, in order to provide a communication and broadcasting integrated service that is anticipated to be provided in the future to a user, it is required that the personal portable mobile satellite communication system effectively provides a communication service and a broadcasting service at the same time. Further, it is required to maximize frequency utilization by increasing spectrum utilization efficiency.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

The present invention has been made in an effort to provide a communication method in a personal portable mobile satellite communication system that has a complementary terrestrial component, having advantages of simultaneously providing a communication service and a broadcasting service according to integration between communication and broadcasting.

Technical Solution

An exemplary embodiment of the present invention provides a communication method in which one frame includes a first resource interval and a second resource interval, and the second resource interval includes a first service interval and a second service interval. The communication method includes: providing a first service to a first terminal through the first resource interval; providing a second service to the first terminal, a second terminal, and a complementary component during a first time interval of the first service interval included in the second resource interval; and providing a third service to the complementary component through the second service interval of the second resource interval.

Another exemplary embodiment of the present invention provides a communication method in which one frame includes a first resource interval and a second resource interval, and the second resource interval includes a first service interval and a second service interval. The communication method includes: providing a symmetrical service to a first terminal through the first resource interval, the symmetrical service being a voice communication service; providing a first service to the first terminal and a second terminal through the first service interval of the second resource interval, the first terminal being located outside the cell coverage of a complementary component, and the second terminal being located within the cell coverage of the complementary component; and providing a second service to the second terminal through the second service interval.

Advantageous Effects

According to the above-described exemplary embodiments, in the mobile communication system that has a complementary terrestrial component, it is possible to simultaneously provide a communication service and a broadcasting service to a terminal according to integration between communication and broadcasting.

Further, a different signal transmission method is used between the complementary terrestrial component and the satellite, and system throughput can be increased. Local broadcasting contents can be effectively transmitted to the terminal.

BRIEF DESCRIPTION OF THE DRAWINGS

FIG. 1 is an exemplary view illustrating a personal portable mobile satellite communication system according to an exemplary embodiment of the present invention.

FIG. 2 is an exemplary view illustrating the case where a broadcasting service and a communication service are provided in a system according to a first exemplary embodiment of the present invention.

FIG. 3 is an exemplary view illustrating the case where frequency resources are used in accordance with a first exemplary embodiment of the present invention.

FIGS. 4 to 6 are exemplary views illustrating resources that are allocated by a satellite using a time division duplex method according to a first exemplary embodiment of the present invention.

FIG. 7 is an exemplary view illustrating the case where a symmetrical service and an asymmetrical service are provided in a system according to a second exemplary embodiment of the present invention.

FIG. 8 is an exemplary view illustrating the case where frequency resources are used in accordance with a second exemplary embodiment of the present invention.

FIGS. 9 to 11 are exemplary views illustrating resources that are allocated by a satellite using a time division duplex method according to a second exemplary embodiment of the present invention.

FIGS. 12 to 14 are exemplary views illustrating resources that are allocated by a complementary terrestrial component using a time division duplex method according to a second exemplary embodiment of the present invention.

FIGS. 15 to 17 are exemplary views illustrating resources that are allocated to transmit communication and broadcasting service traffic according to a second exemplary embodiment of the present invention.

MODE FOR THE INVENTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

It will be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. In addition, the terms "-er", "-or," and "module" described in the specification mean units for processing at least one function and operation and can be implemented by hardware components or software components and combinations thereof.

In the present specification, a mobile station (MS) may designate a terminal, a mobile terminal (MT), a subscriber station (SS), a portable subscriber station (PSS), user equipment (UE), or an access terminal (AT), and include a part or all of functions of the mobile terminal, the subscriber station, the portable subscriber station, and the user equipment.

In the present specification, a base station (BS) may designate an access point (AP), a radio access station (RAS), a node B, a base transceiver station (BTS), or a mobile multi-hop relay (MMR)-BS, and includes a part or all of functions of the access point, the radio access station, the node B, the base transceiver station, and the MMR-BS.

In general, both a satellite and a complementary terrestrial component use a frequency division duplex (FDD) method and a time division duplex (TDD) method to transmit a signal.

At this time, according to the communication method according to an exemplary embodiment of the present invention, a satellite uses an FDD method to transmit a signal in order to provide a communication service, and a complementary terrestrial component uses a TDD method to transmit a signal in order to provide a broadcasting service.

In the exemplary embodiment of the present invention, a communication method in a mobile communication system using a satellite is described as an exemplary embodiment, but the present invention is not limited thereto.

Accordingly, in order to allow a communication service signal transmitted from the satellite to be transmitted to a terminal, the satellite allocates an uplink/downlink frame to each of frequency resources according to the FDD method. Then, in consideration of a broadcasting service that is provided to the terminal through the complementary terrestrial component, the complementary terrestrial component changes a communication method to the TDD method through switching at the intermediate of the uplink/downlink frame of each frequency resource.

Hereinafter, an exemplary embodiment of the present invention will be described with reference to the accompanying drawings.

First, referring to FIG. 1, an exemplary embodiment of a personal portable mobile satellite communication system that has maximum commonality with a terrestrial system will be described on the basis of a signal transmission method in the system. In this case, the exemplary embodiment of the present invention can be applied to satellite mobile communication systems that use a complementary terrestrial component, regardless of the access standards, such as orthogonal frequency division multiplexing (OFDM), code division multiple access (CDMA), or time division multiple access (TDMA).

FIG. 1 is an exemplary view illustrating a personal portable mobile satellite communication system according to an exemplary embodiment of the present invention.

As shown in FIG. 1, the personal portable mobile satellite communication system according to the exemplary embodiment of the present invention uses one satellite or a group of geostationary earth orbit (GEO) satellites to provide services to terminals 300 and 300'. At this time, a satellite 100 uses a mono-spot beam or a multi-spot beam to transmit a signal. In this case, the mono-spot beam is used to narrow a communication area of a beam that is transmitted to cover only a small area where communication traffic is large and to concentrate power. The multi-spot beam is used to enlarge a narrow communication area.

The terminals 300 and 300' that receive a signal transmitted from the satellite 100 may be located at one spot or where a plurality of spots are set as a group in the case of a user who uses a roaming service. A gateway (not shown in FIG. 1) that is located between the terminals 300 and 300' and the satellite 100 may be a centralized gateway or one gateway of a group of geographically distributed gateways by the request from a service provider.

The gateway transmits signals transmitted from the terminals 300 and 300' to a satellite base station and a satellite control station. The satellite base station and the satellite control station perform the same functions as a base station and a control station used in a terrestrial system 400, and may exist inside or outside the gateway. In this case, the terrestrial system 400 includes base stations 410, a base station controller 420, and a core network 430. When a signal is transmitted from the core network 430 to the base station controller 420, the terrestrial system 400 allows the terminals to use a terrestrial network to perform communication. In contrast, when the core network 430 transmits a signal to the satellite gateway, the terminal can perform communication through the satellite.

The system according to the exemplary embodiment of the present invention includes a complementary terrestrial component 200 in consideration of when a signal transmitted from the satellite 100 cannot be transmitted to a shadow area formed by buildings or mountains. In this case, the complementary terrestrial component 200 uses the same frequency as the satellite for coverage continuity in a shadow area, and amplifies a signal transmitted from the satellite and transmits the signal to the shadow area.

In this system environment, both the satellite 100 and the complementary terrestrial component 200 can provide a broadcasting service to the terminals 300 and 300'. At this time, for nationwide coverage, such as areas outside the downtown or in the country where a line of sight is secured, a broadcasting service is provided through the satellite 100. In the downtown area or indoor environment where a large number of buildings exist and it is difficult to transmit a satellite signal, a broadcasting service is provided through the complementary terrestrial component 200.

Accordingly, since a repeater does not provide voice and data communication services to the terminals, the repeater considers only downlink transmission. When the complementary terrestrial component needs information for a broadcasting service, the information is transmitted through the terrestrial system 400. However, when the broadcasting service is provided through the satellite 100, the information for a broadcasting service is provided from the terminals 300 and 300' to the satellite 100 through an uplink that is formed between the satellite and the terminals. In this case, the information for a broadcasting service means information on a broadcasting service that a user desires to receive.

In a system environment according to a first exemplary embodiment of the present invention, when a communication service is provided to the terminals 300 and 300', it is not possible to provide a communication service to all users in a satellite beam having wide coverage with restricted frequency resources. Thus, through the satellite, a communication system including voice and data services is provided to only a few users in an area that the terrestrial system 400 cannot cover.

That is, as shown in FIG. 1, the terminal 300' that is located in an area that the terrestrial system 400 cannot cover is supplied with voice and data services through the satellite 100. Then, if the terminal enters in the coverage that the terrestrial system 400 can cover, vertical handover is generated in which the terminal can receive a service through the terrestrial system 400 having superior transmission efficiency.

Thus, the terminals 300 and 300' are required to receive both a signal transmitted from the terrestrial system 400 and a signal transmitted from the satellite. At this time, when the terrestrial system 400 and the satellite 100 require different types of wireless interface standards to perform communication, chip overhead of the terminals increases. Accordingly, the terminals according to the exemplary embodiment of the present invention use a satellite wireless interface that has maximum commonality with the terrestrial system 400.

Next, an example of providing broadcasting and communication services in a system environment that has the complementary terrestrial component described with reference to FIG. 1 will be described with reference to FIG. 2.

FIG. 2 is an exemplary view illustrating the case where a broadcasting service and a communication service are provided in a system according to a first exemplary embodiment of the present invention.

As shown in FIG. 2, the satellite 100 forms one large beam, and a plurality of cells 600 to 650 that are located in a coverage area 500 of the beam allow coverage by the complementary terrestrial component. The terminal 300' that is located outside the coverage by the complementary terrestrial component receives both a communication service and a broadcasting service from the satellite 100. The terminal 300 that is located in the coverage by the complementary terrestrial component can independently receive a local broadcasting service in addition to a global broadcasting service transmitted from the satellite.

First, the case where the terminals 300 and 300' are supplied with a broadcasting service will be described. The broadcasting service is divided into a global broadcasting service and a local broadcasting service. That is, broadcasting contents that the satellite 100 transmits to provide a broadcasting service to the complementary terrestrial component 200 include global broadcasting contents and local broadcasting contents.

The global broadcasting contents are transmitted to all of the complementary terrestrial components 200 to 250 and the terminal 300' outside the coverage by the complementary terrestrial components. The local broadcasting contents are transmitted to a group of complementary terrestrial components that correspond to the local broadcasting contents. In this case, communication between the satellite 100 and the complementary terrestrial components and communication between the complementary terrestrial components and the terminals may be performed using the same frequency bands and interface or different frequency bands and interfaces. If the different frequency bands and interfaces are used, the complementary terrestrial component performs frequency conversion.

Information for a global broadcasting service is transmitted to the satellite 100 through an uplink. At this time, the terminal 300' that is outside the coverage by the complementary terrestrial component 200 transmits the information to the satellite 100 using an uplink between the satellite 100 and the terminal 300', and the terminal 300 that is within the coverage by the complementary terrestrial component 200 transmits the information to core network 100 using the terrestrial system (refer to reference numeral 400 of FIG. 1). Thus, when a global broadcasting service is provided to the terminal 300 through the complementary terrestrial component 200, only a downlink is considered between the satellite 100 and the complementary terrestrial component 200.

In the case where the satellite 100 provides a communication service including a voice service to the terminal 300', a communication service is provided only when the terminal 300' is outside the coverage by the complementary terrestrial component 200. In this case, the satellite 100 transmits communication traffic including only communication contents to the terminal 300'.

Next, the case where frequency resources are used to provide communication and broadcasting services to terminals using different communication methods in the system according to the exemplary embodiment of the present invention will be described with reference to FIG. 3. In this case, the first exemplary embodiment of the present invention is applied to the case in which only a downlink is considered between the complementary terrestrial component and the satellite.

FIG. 3 is an exemplary view illustrating the case where frequency resources are used in accordance with a first exemplary embodiment of the present invention.

As shown in FIG. 3, a communication service provider selects a frequency for each of an uplink and a downlink in order to apply an FDD method to available frequency bands. At this time, the uplink/downlink frequency bands support both an FDD method and a TDD method in frames that have the same length.

When a communication service such as voice and data services is provided to the terminal through the frequency band, the satellite provides a communication service to only a terminal that can directly communicate with the satellite. Thus, a method that is suitable for direct communication with the satellite is selected.

In the case of the TDD method, a transmission gap needs to be set in consideration of a delay time between a transmitter and a receiver between a downlink and an uplink and an uplink/downlink switching time of the transmitter/receiver. At this time, since the round trip delay time of the satellite system is longer than the round trip delay time of the terrestrial system, transmission/reception intervals become relatively lager than a transmission gap interval.

For this reason, the TDD method is not suitable for direction communication in the satellite communication system. Accordingly, the FDD method is used to provide a communication service. In the FDD method shown in FIG. 3, a frequency $f_D$ is allocated to a downlink and an $f_U$ is allocated to an uplink.

When a broadcasting service is provided to terminals in a cell region of the complementary terrestrial component, the uplink uses the terrestrial system 400. As a result, the uplink is not considered between the complementary terrestrial component and the satellite. When the terminal is outside the cell region, traffic of the broadcasting service is concentrated on the downlink, and the traffic amount of the uplink is very small.

As such, when the broadcasting service is provided using the FDD method, it is possible to transmit traffic to the terminals through only the downlink. Thus, the broadcasting service is regarded as an asymmetrical service in which only downlink traffic exists. Accordingly, when the FDD method is used to provide a broadcasting service, the frequency resources that are allocated to the uplink are wasted and thus the TDD method that is suitable for the asymmetrical service is applied.

That is, in the case where the TDD method is applied, global broadcasting contents and local broadcasting contents for a broadcasting service are provided to the terminals using the satellite and the complementary terrestrial component. At this time, the global broadcasting contents may be provided to the terminals using one of the satellite and the complementary terrestrial component or both the satellite and the complementary terrestrial component. Meanwhile, the satellite transmits the local broadcasting contents to the complementary terrestrial component and then the complementary terrestrial component transmits the local broadcasting contents to the terminals.

That is, when the terminal is provided with the global broadcasting contents, it is provided with the global broadcasting service traffic through the satellite in the case where the terminal is outside the coverage by the complementary terrestrial component, and is provided with the global broadcasting service traffic through the complementary terrestrial component in the case where the terminal is within the coverage by the complementary terrestrial component. When the terminal can receive the broadcasting service traffic from both the satellite and the complementary terrestrial component, the terminal can receive the broadcasting service traffic from one of the satellite and the complementary terrestrial component or both the satellite and the complementary terrestrial component.

Meanwhile, the local broadcasting contents can be provided only when the terminal is within the coverage by a group of complementary terrestrial components that provide the corresponding local broadcasting contents. In this case, the satellite transmits the local broadcasting contents to a specific group of complementary terrestrial components using the TDD method. After receiving the local broadcasting contents, the complementary terrestrial component transmits the local broadcasting contents to the terminal using the TDD method.

In each frame of the uplink/downlink, a point of time when the FDD method is switched to the TDD method is defined as a switching point. The switching point becomes different according to system requirements in one frame. That is, in consideration of the amounts of communication service traffic and broadcasting service traffic that the system desires to provide, if the amount of communication service traffic is large, the switching point may be adjusted such that the amount of frequency resources allocated according to the FDD method is large, and if the amount of broadcasting service traffic is large, the switching point may be adjusted such that the amount of frequency resources allocated according to the TDD method is large. However, if the switching point is determined once, the switching point should be equally applied to the satellite, the complementary terrestrial component, and the terminal on the corresponding system, and each of the satellite, the complementary terrestrial component, and the terminal should know positional information of the switching point.

As described above, since the satellite and the terminal can directly communicate with each other in the case of using the FDD method, the entire satellite beam can be covered. Further, since the uplink and the downlink are symmetrical, a communication service can be effectively provided to the terminal, and medium/low-speed data services can be easily provided in consideration of a long round trip delay time of the satellite.

Meanwhile, in the case of using the TDD method, the satellite can directly provide a broadcasting service to the terminal and provide the broadcasting service to the terminal through the complementary terrestrial component. The TDD method is required to allocate a global broadcasting service provided from both the satellite and the complementary terrestrial component and a local broadcasting service provided from only the complementary terrestrial component to improve frequency utilization efficiency and provide the global broadcasting service and the local broadcasting service to the terminal.

A method in which a satellite allocates resources according to a first exemplary embodiment of the present invention will be described with reference to FIGS. 4 to 6.

FIGS. 4 to 6 are exemplary views illustrating resources that are allocated by a satellite using a time division duplex method according to a first exemplary embodiment of the present invention.

Specifically, FIG. 4 is an exemplary view illustrating the case where global broadcasting contents and local broadcasting contents are allocated in a TDD interval of one frame. That is, the global broadcasting contents that are transmitted to provide a global broadcasting service are allocated to a time domain G, and the local broadcasting contents for each complementary terrestrial component are allocated to resource regions L1, L2, L3, and L4. In the first exemplary embodiment of the present invention, the number of complementary terrestrial components that are capable of providing the local broadcasting service is four, but the present invention is not limited thereto. When there is no local broadcasting content, all TDD intervals of the TDD method may be allocated to the global broadcasting contents.

Next, a resource allocation method in each region is as follows. In the case of the global broadcasting contents, the satellite and the complementary terrestrial component simultaneously provide a broadcasting service to the terminal (S→CTC & MS, CTC→MS). In this case, generally, the resources may include a frequency resource, a time resource, a code resource, or a space resource. In the exemplary embodiment of the present invention, the time resource is exemplified.

In all of the resource intervals G that are allocated to the global broadcasting contents, the satellite and the complementary terrestrial component transmit the global broadcasting contents to the terminal. At this time, the complementary terrestrial component can perform frequency conversion. This is because communication between the satellite and the complementary terrestrial component and communication between the complementary terrestrial component and the terminal may be performed using different frequency bands and interfaces.

Thus, if a signal to be transmitted from the satellite to the terminal is transmitted later than a signal to be transmitted from the satellite to the complementary terrestrial component, the terminal can synchronize a signal that is transmitted from the satellite and a signal that is transmitted from the complementary terrestrial component. This case corresponds to the case where the signal to be transmitted from the satellite to the terminal is transmitted later in consideration of a signal processing time by the complementary terrestrial component. In this case, diversity gain can be obtained from the two signals.

Next, resource intervals L1, L2, L3, and L4 that are allocated to local broadcasting contents will be described. The resources that are allocated to each complementary terrestrial component group are divided into two parts. Differently from the global broadcasting contents, with regard to the local broadcasting contents, the terminal does not consider that the terminal directly communicates with the satellite. Thus, in the first interval, the satellite transmits specific local broadcasting contents to a specific complementary terrestrial component group (S CTC), and in the next interval, the complementary terrestrial component group transmits the local broadcasting contents to the terminal in a cell region of the group (CTC MS).

As such, in the case where the resources are allocated, even if the satellite signal and the complementary terrestrial component signal are simultaneously transmitted to the terminal in the cell region, the satellite signal and the complementary terrestrial component signal are transmitted in different resource intervals. Thus, signal interference does not occur between the two signals. Therefore, when the terminal can detect the satellite signal, diversity gain can be obtained from the satellite signal and the complementary terrestrial component signal. Unlike the case of the global broadcasting contents, the satellite does not transmit the signal such that all terminals can receive the signal but transmits the signal such that only the complementary terrestrial component can detect the satellite signal. Therefore, the satellite can transmit the signal with superior transmission efficiency.

FIG. 4 shows a method of allocating resources to local broadcasting contents, while FIG. 5 shows a method of allocating resources to global broadcasting contents using a different access method. According to the structure shown in FIG. 5, the signal transmitted from the satellite to the terminal and the signal transmitted from the complementary terrestrial component to the terminal are transmitted in different resource intervals so as to remove signal interference between the two signals.

FIG. 6 is an exemplary view illustrating the case where resources are allocated when considering that the entire system throughput provided by the satellite signal and the system throughput provided by the complementary terrestrial component that has relatively larger power than that of the satellite signal and can obtain multipath gain are high.

If resources are allocated according to the method shown in FIG. 6, the complementary terrestrial component can provide a service to the terminal at a data rate that is higher than a data rate when the satellite transmits the signal to the terminal and the complementary terrestrial component.

Thus, the complementary terrestrial component can transmit the global broadcasting contents transmitted from the satellite to the terminal in a short time. During the remaining resource interval, the complementary terrestrial component receives the local broadcasting contents of the group of complementary terrestrial components to which the complementary terrestrial component belongs from the satellite and transmits the local broadcasting contents to the terminal, thereby increasing the entire system capacity.

A description has been given of an effective communication method in the case where the complementary terrestrial component does not have an uplink function, that is, a function of receiving a signal from the terminal and transmitting the signal to the satellite. Next, a description is given of a method of effectively providing communication and broadcasting services in the case where the complementary terrestrial component has an uplink function and can provide a communication service.

When the complementary terrestrial component provides a real-time service such as a voice service, QoS is not satisfied due to transmission delay. Thus, the case where the complementary terrestrial component provides a medium/low-speed data communication service will be exemplified. First, an example of a system for providing the medium/low-speed service will be described with reference to FIG. 7. In the second exemplary embodiment of the present invention, the provided services are divided into a symmetrical service and an asymmetrical service, differently from the first exemplary embodiment.

FIG. 7 is an exemplary view illustrating the case where a symmetrical service and an asymmetrical service are provided in a system according to a second exemplary embodiment of the present invention.

As shown in FIG. 7, a communication service, such as voice contents, is referred to as a symmetrical service because traffic between an uplink and a downlink symmetrically inflows. The symmetrical service is provided to only a terminal that is located outside the complementary terrestrial component coverage in the satellite beam coverage. At this time, resources are used according to an FDD method.

Meanwhile, the asymmetrical service means a data communication service and global and local broadcasting services, and resources are used according to a TDD method. In the case of the broadcasting service in the asymmetrical service, the same contents are broadcast to all users who desire to use the broadcasting service, while in the case of the communication service in the asymmetrical service, specific contents are transmitted to an individual person. Therefore, the services are transmitted through different resource intervals.

As such, in order to provide services in accordance with the second exemplary embodiment of the present invention, a method using frequency resources will be described with reference to FIG. 8.

FIG. 8 is an exemplary view illustrating the case where frequency resources are used in accordance with a second exemplary embodiment of the present invention.

As shown in FIG. 8, in order to apply an FDD method to an available frequency band, a frequency for each of an uplink and a downlink is selected. The selected uplink and downlink frequency bands can support an FDD method and a TDD method in frames having the same length, respectively.

In this case, a symmetrical service such as voice contents is provided to only a terminal that can directly communicate with the satellite. Thus, it is needed to select a communication method that is suitable for direct communication with the satellite.

In the case of the TDD method, a transmission gap interval needs to be set between the downlink and the uplink. Here, the transmission gap interval means a round trip delay time between the transmitter and the receiver and an uplink/downlink switching time of the transmitter/receiver. Since the round trip delay time of the satellite system is much longer than the round trip delay time of the terrestrial system, the transmission gap interval relatively increases, as compared with the transmission/reception intervals. Thus, it is not preferable for the TDD method to be used in a satellite communication system.

Accordingly, an FDD method is used to provide a communication service in the satellite communication system. According to the FDD method shown in FIG. 8, a frequency $f_D$ is allocated to a downlink and an $f_U$ is allocated to an uplink.

Next, the case of the asymmetrical service, which means the broadcasting service and the partial communication service, will be described. When the terminal is located in the cell coverage of the complementary terrestrial component, the asymmetrical service that is transmitted from the satellite is provided to the terminal through an uplink and a downlink that are formed between the complementary terrestrial component and the terminal. In this case, the broadcasting service becomes a main service, and the communication service is provided to only a terminal that cannot use a few terrestrial networks.

Meanwhile, when the terminal is located outside the cell coverage, the medium/low-speed data traffic in addition to the broadcasting service is concentrated on the downlink. At this time, uplink traffic may be ignored. Accordingly, when the FDD method is used to provide an asymmetrical service such as a data communication service and a broadcasting service, waste of the frequency resources that are allocated to the uplink is severe, and thus the TDD method that is suitable for an asymmetrical service is used.

That is, in the resource interval where the TDD method is applied, data communication traffic, global broadcasting service traffic, and local broadcasting service traffic are provided to a terminal through the satellite and the complementary terrestrial component. The data communication traffic and the global broadcasting service traffic are provided to the terminal through the satellite and the complementary terrestrial component, while the local broadcasting service traffic is provided to the terminal through only the complementary terrestrial component.

That is, in the case where the terminal receives the global broadcasting service traffic from the satellite, if the terminal is located outside the cell coverage of the complementary terrestrial component, the terminal receives the global broadcasting service traffic from the satellite. If the terminal is located within the cell coverage of the complementary terrestrial component, the terminal receives the global broadcasting service traffic from the complementary terrestrial component. If the terminal is disposed at a location where the terminal can receive a signal from both the satellite and the complementary terrestrial component, the terminal can receive the global broadcasting service traffic from both the satellite and the complementary terrestrial component.

Meanwhile, the terminal can receive the local broadcasting service traffic only when the terminal is within the cell coverage of the specific group of complementary terrestrial components. In this case, the satellite uses the TDD method to transmit the specific local broadcasting service traffic to the specific group of complementary terrestrial components. After receiving the specific local broadcasting service traffic, the complementary terrestrial components use the TDD method to provide the specific local broadcasting service traffic to the terminal.

An example of allocating resources that is performed to achieve the above object will be described with reference to FIGS. 7A to 7C.

FIGS. 9 to 11 are exemplary views illustrating resources that are allocated using a time division duplex method according to a second exemplary embodiment of the present invention.

In each frame of an uplink and a downlink described with reference to FIG. 8, a point of time when the FDD method is switched to the TDD method is defined as a switching point. This switching point becomes different according to system requirements in one frame. That is, in consideration of the amounts of symmetrical service traffic and asymmetrical service traffic that the system desires to provide, if the amount of symmetrical service traffic is large, the switching point may be adjusted such that the amount of frequency resources allocated according to the FDD method is large, and if the amount of asymmetrical service traffic is large, the switching point may be adjusted such that the amount of frequency resources allocated according to the TDD method is large. However, if the switching point is determined once, the switching point should be equally applied to the satellite, the complementary terrestrial component, and the terminal on the corresponding system, and each of the satellite, the complementary terrestrial component, and the terminal should know positional information of the switching point.

In the FDD method, since the satellite and the terminal directly communicate with each other, it is possible to cover the entire satellite beam that includes the complementary terrestrial component. If the resources are allocated using the FDD method, the uplink and the downlink can be symmetrically allocated, which makes it possible to effectively provide a symmetrical service, such as a real-time voice service.

Meanwhile, if the resources are allocated using the TDD method, the satellite and the terminal can directly communicate with each other and the traffic is provided to the terminal through the complementary terrestrial component. Thus, the TDD method is required to allocate the data communication service traffic and the global broadcasting service traffic provided from both the satellite and complementary terrestrial component, and the local broadcasting service traffic provided from only the complementary terrestrial component, to increase frequency utilization efficiency and provide the traffic to the terminal.

First, referring to FIG. 9, it can be seen that an asymmetrical service is allocated to a TDD interval in one frame. That is, the global broadcasting contents G and data communication contents $D_G$ for terminals outside the cell coverage of the complementary terrestrial component are allocated to a resource region that is displayed as $G\&D_G$.

Further, with respect to complementary terrestrial component groups L1, L2, L3, and L4, the local broadcasting contents and data communication contents for the terminals in the corresponding group cells are allocated to $L1\&D_{L1}$, $L2\&D_{L2}$, $L3\&D_{L3}$, and $L4\&D_{L4}$ resource regions. In the exemplary embodiment of the present invention, the number of complementary terrestrial component groups is four, but the present invention is not limited thereto.

A method of allocating resources in each region will be described. First, each region is divided into a region for transmitting the global broadcasting contents and a region for transmitting the data communication contents. This reason is as follows. Since the broadcasting contents are commonly transmitted to all users, the resources can be commonly allocated without discriminating resource slots between the users. Meanwhile, in the case of the data communication contents, a different resource needs to be allocated to each terminal.

In the $G\&D_G$ interval, the resources are divided into two intervals. The first interval means a downlink in which the satellite transmits a signal to the complementary terrestrial component and the terminal and the complementary terrestrial component also transmits the signal received from the satellite to the terminal. In addition, the second interval means an uplink in which the terminal directly transmits the data communication contents to the satellite.

Meanwhile, in the $L\&D_L$ interval, resources are divided into four intervals. The first interval means a downlink through which the satellite transmits a signal to the complementary terrestrial component and the second interval means an uplink through which the complementary terrestrial component transmits a signal to the satellite. The third interval means a downlink in which the complementary terrestrial component transmits a signal to the terminal and the fourth interval means an uplink through which the terminal transmits a signal to the complementary terrestrial component.

With regard to the global broadcasting contents, the case where the satellite and the complementary terrestrial component simultaneously provide a broadcasting service to the terminal is exemplified. Since the satellite and the complementary terrestrial component simultaneously provide a broadcasting service to the terminal, in all intervals that are allocated to the global broadcasting contents, the satellite and the complementary terrestrial component simultaneously transmit the global broadcasting contents to the terminal.

In this case, when wireless interface and a utilization frequency between the satellite and the complementary terrestrial component are different from those between the satellite and the terminal, the complementary terrestrial component performs a frequency conversion function. Therefore, the signal to be transmitted from the satellite to the terminal is transmitted later than the signal to be transmitted from the satellite to the complementary terrestrial component in consideration of signal processing resources of the complementary terrestrial component. As a result, when the terminal can synchronize the signal transmitted from the satellite and the signal transmitted from the complementary terrestrial component, diversity gain can be obtained from the two signals.

In the case of the data communication contents $D_G$, the resources are divided into a plurality of slots and the resources are allocated to each user terminal. At this time, in the case of the data communication contents, the satellite communicates with a terminal that is outside the cell coverage of the complementary terrestrial component, and thus it is not necessary to perform communication through the complementary terrestrial component. Accordingly, resources for communication are divided into two intervals and used.

Next, among the resource intervals that are allocated to the local broadcasting contents, one resource interval L2 & $D_{L2}$ is exemplified. The resources that are allocated to each complementary terrestrial component group are divided into two intervals L2 and $D_{L2}$. Differently from the global broadcasting content resource interval, the case where the terminal directly communicates with the satellite is not considered. Therefore, in the first interval, the satellite transmits the local broadcasting contents and the data communication contents for the terminal within the cell coverage of the specific complementary terrestrial component group to the complementary terrestrial component group (S→CTC).

In a next interval, the complementary terrestrial component group transmits data communication contents transmitted from a terminal within the cell coverage of the group to the satellite (CTC→S). In a next interval, the complementary terrestrial component group transmits the data communication contents received from the satellite to the terminal (CTC→MS), and the terminal transmits its data communication contents to the complementary terrestrial component (MS→CTC).

When communication is performed in the above-described method, even though the terminal within the cell coverage simultaneously receives the signals from the satellite and the complementary terrestrial component, the satellite signal and the complementary terrestrial component signal are transmitted at different resource intervals. As a result, signal interference does not occur between the two signals. Further, when the terminal can detect the satellite signal, diversity gain can be obtained from the satellite signal and the complementary terrestrial component signal.

Differently from the global broadcasting contents, the satellite does not transmit the signal such that all terminals can receive the signal, but transmits the signal such that the only the complementary terrestrial component can detect the satellite signal. Accordingly, it is possible to transmit the signal at a high data rate.

Referring to FIG. 10, the local broadcasting contents are provided according to the method described with reference to FIG. 9. Meanwhile, with regard to the global broadcasting contents, the signal transmitted from the satellite to the terminal and the signal transmitted from the complementary terrestrial component to the terminal are transmitted in the different intervals so as to remove signal interference.

Referring to FIG. 11, the complementary terrestrial component can provide a service to the terminal at a data rate that is higher than a data rate when the satellite transmits the signal to the terminal and the complementary terrestrial component. This is done in consideration of the fact that the entire system throughput provided by the satellite signal and the system throughput provided by the complementary terrestrial component that has power that is relatively higher than that of the satellite signal and can obtain a multipath gain are high. Therefore, the complementary terrestrial component transmits data transmitted from the satellite in the interval that is shorter than the resource transmission interval of the complementary terrestrial component shown in FIG. 10. During the remaining resource interval, the complementary terrestrial component receives the local broadcasting contents of the complementary terrestrial component group that the complementary terrestrial component belongs or different data communication contents from the satellite and provides the contents to the terminal, thereby increasing the entire system capacity.

The communication method in the case where the complementary terrestrial component does not have an uplink function, that is, a function of receiving the signal from the terminal and transmitting the signal to the satellite, has been described. Next, referring to FIGS. 12 to 14, a description is given of a method of effectively providing communication and broadcasting services in the case where the complementary terrestrial component has an uplink function and can provide a communication service. When the complementary terrestrial component actually provides real time services such as a voice service, QoS cannot be satisfied due to transmission delay. Thus, the case where the complementary terrestrial component provides only a medium/low-speed data communication service will be exemplified.

FIGS. 12 to 14 are exemplary views illustrating resources that are allocated by a complementary terrestrial component using a time division duplex method according to a second exemplary embodiment of the present invention.

Referring to FIG. 12, since the satellite and the complementary terrestrial component simultaneously provide a broadcasting service to the terminal, in all resource intervals that are allocated to the global broadcasting contents, the satellite and the complementary terrestrial component simultaneously transmit the global broadcasting contents to the terminal.

Next, resource intervals that are allocated to the local broadcasting contents will be described. Resources that are allocated to each complementary terrestrial component group are divided into two parts. Differently from the global broadcasting contents, the case where the terminal directly communicates with the satellite is not considered. Therefore, in the first interval, the satellite transmits the specific local broadcasting contents to the specific complementary terrestrial component group. In a next interval, the complementary terrestrial component group transmits the local broadcasting contents to the terminal within the cell coverage of the group.

FIG. 13 shows an example of resource slot allocation to describe a process of transmitting communication and broadcasting service traffic to a specific terminal through a complementary terrestrial component in a system for a method in which a satellite allocates resources using a TDD method. The local broadcasting contents are transmitted by the method shown in FIG. 12.

Meanwhile, the global broadcasting contents are provided by a different access method. That is, the signal to be transmitted from the satellite to the terminal and the signal to be transmitted from the complementary terrestrial component to the terminal are transmitted in different resource intervals so as to remove signal interference between the signals.

Referring to FIG. 14, a process of transmitting communication service traffic and broadcasting service traffic to a specific terminal through the complementary terrestrial component such that the satellite allocates resources using the TDD method is shown as an example of resource slot allocation. In consideration of the fact that the entire system throughput provided by the satellite signal and the system throughput provided by the complementary terrestrial component that has relatively higher power than that of the satellite signal and can obtain multipath gain are high, the complementary terrestrial component can provide a service to the terminal at a data rate that is higher than a data rate when the satellite transmits the signal to the terminal and the complementary terrestrial component.

Thus, the complementary terrestrial component transmits data transmitted form the satellite in an interval that is shorter than a resource transmission interval of the complementary terrestrial component. During the remaining transmission interval, the complementary terrestrial component receives the local broadcasting contents of the complementary terrestrial component group to which the complementary terrestrial component belongs from the satellite and transmits the local broadcasting contents to the terminal, thereby increasing the entire system capacity.

Next, an example of resource slot allocation to describe a process of transmitting communication and broadcasting service traffic to a specific terminal through the complementary terrestrial component will be described with reference to FIGS. 15 to 17.

FIGS. 15 to 17 are exemplary views illustrating resources that are allocated to transmit communication and broadcasting service traffic according to a second exemplary embodiment of the present invention.

Referring to FIG. 15, a method of providing global broadcasting contents will be described. The satellite and the complementary terrestrial component simultaneously provide a broadcasting service to the terminal. As such, since the satellite and the complementary terrestrial component simultaneously provide the broadcasting service to the terminal, in all resource intervals that are allocated to the global broadcasting contents, the satellite and the complementary terrestrial component simultaneously transmit the global broadcasting contents to the terminal.

Meanwhile, the data communication contents $D_G$ are for data communication with the terminal outside the cell coverage of the complementary terrestrial component, and thus it is not necessary to perform communication through the complementary terrestrial component. Therefore, for the purpose of communication, resources are divided into only two parts.

Next, resource intervals that are allocated to the local broadcasting contents will be described. Resources that are allocated to each complementary terrestrial component group are divided into two parts. Differently from the global content resource interval, the case where the terminal directly communicates with the satellite is not considered. Therefore, in the first interval, the satellite transmits, to the complementary terrestrial component, specific local broadcasting contents and data communication contents for the terminal that is provided with the specific local broadcasting contents and within the cell coverage of the complementary terrestrial component group.

In a next interval, the complementary terrestrial component receives the data communication contents from the terminal within the cell coverage and transmits the data communication contents to the satellite. In a next interval, the complementary terrestrial component transmits the contents received from the satellite to the terminal and the terminal transmits its data communication contents to the complementary terrestrial component.

Referring to FIG. 16, a description is given of resource slot allocation to describe a process of transmitting communication service traffic and broadcasting service traffic to a specific terminal through a complementary terrestrial component. The local broadcasting contents are transmitted by the method shown in FIG. 15, but the global broadcasting contents are provided by a different access method.

When it is assumed that the interface between the satellite and the complementary terrestrial component is the same as the interface between the terminal and the satellite in the same frequency bandwidth, signal delay occurs between the signal directly transmitted from the satellite and the signal transmitted from the complementary terrestrial component. As shown in FIG. 16, the signal transmitted from the satellite to the terminal and the signal transmitted from the complementary terrestrial component to the terminal are transmitted in different resource intervals.

FIG. 17 shows an example of resource slot allocation to describe a process of transmitting communication service traffic and broadcasting service traffic to a specific terminal through a complementary terrestrial component. As shown in FIG. 17, the complementary terrestrial component can provide a service to the terminal at a data rate that is higher than a data rate when the satellite transmits the signal to the terminal and the complementary terrestrial component. This is done in consideration of the fact that the entire system throughput provided by the satellite signal and the system throughput provided by the complementary terrestrial component that has relatively higher power than that of the satellite signal and can obtain multipath gain are high. Therefore, the complementary terrestrial component transmits data transmitted from the satellite in an interval that is shorter than the resource transmission interval of the complementary terrestrial component.

During the remaining resource interval, the complementary terrestrial component receives the local broadcasting contents of the complementary terrestrial component group that the complementary terrestrial component belongs or different data communication contents from the satellite and transmits the contents to the terminal. If the service is provided in this way, it is possible to increase the entire system capacity.

The exemplary embodiments of the present invention that have been described above may be implemented by not only a method and an apparatus but also a program capable of realizing a function corresponding to the structure according to the exemplary embodiments of the present invention and a recording medium having the program recorded therein. It can be understood by those skilled in the art that the implementation can be easily made from the above-described exemplary embodiments of the present invention.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A communication method in a mobile communication system,
in which one frame includes a first resource interval and a second resource interval and the second resource interval includes a first service interval and a second service interval,
the communication method comprising:
providing a first service to a first terminal through the first resource interval;
providing a second service to the first terminal, a second terminal, and a complementary component during a first time interval of the first service interval included in the second resource interval; and
providing a third service to the complementary component through the second service interval of the second resource interval.

2. The communication method of claim 1, wherein:
the second terminal is located within the cell coverage of the complementary component; and the first terminal is located outside the cell coverage of the complementary component.

3. The communication method of claim 2, wherein the providing of the second service includes allowing the complementary component to provide the second service to the second terminal through the first service interval during the first time interval.

4. The communication method of claim 3, wherein the providing of the second service further includes:
providing the second service to the complementary component, the first terminal, and the second terminal through the first service interval during the first time interval; and
allowing the complementary component to provide the second service to the second terminal during a second time interval after the first time interval.

5. The communication method of claim 2,
wherein the providing of the third service includes allowing the complementary component to provide the third service to the second terminal, and
the third service is provided to the second terminal using partial resources of the second time interval.

6. The communication method of claim 2, wherein the first resource interval and the second resource interval are allocated using different communication methods, respectively.

7. The communication method of claim 6, wherein:
the first service is a service that is provided to the first terminal through the first resource interval;
the second service is a global broadcasting service that is provided to the second terminal through the first service interval; and
the third service is a local broadcasting service that is provided to the second terminal through the second service interval.

8. The communication method of claim 7, wherein the first service interval is a resource interval in which the global broadcasting service is provided, and the second service interval is a resource interval in which the local broadcasting service corresponding to the complementary component is provided.

9. The communication method of claim 6, wherein the first resource interval is a resource interval that is allocated using a frequency division duplex method, and the second resource interval is a resource interval that is allocated using a time division duplex method.

10. A communication method using a mobile communication system,
in which one frame includes a first resource interval and a second resource interval and the second resource interval includes a first service interval and a second service interval,
the communication method comprising:
providing a symmetrical service to a first terminal through the first resource interval, the symmetrical service being a voice communication service;
providing a first service to the first terminal and a second terminal through the first service interval of the second resource interval, the first terminal being located outside the cell coverage of a complementary component, the second terminal being located within the cell coverage of the complementary component; and
providing a second service to the second terminal through the second service interval.

11. The communication method of claim 10,
wherein the first resource interval includes an uplink interval and a downlink interval, and
the providing of the first service includes:
transmitting contents for the first service to the complementary component and the first terminal through the downlink interval;
allowing the complementary component to transmit the contents for the first service to the first terminal through the same interval as the downlink interval; and
receiving the contents for the first service from the first terminal through the uplink interval.

12. The communication method of claim 11, further comprising:
transmitting the contents for the first service to the complementary component, the first terminal, and the second terminal through a first downlink interval of the downlink interval;
receiving the contents for the first service from the first terminal and the second terminal through the uplink interval; and
allowing the complementary component to transmit the contents for the first service to the first terminal through a second downlink interval after the uplink interval,
wherein a second service is provided to the second terminal during a partial interval of the second downlink interval.

13. The communication method of claim 10,
wherein the second resource interval includes a plurality of uplink intervals and a plurality of downlink intervals, and
the providing of the second service includes:
transmitting contents for the second service to the complementary component through a first downlink interval; and
receiving a signal transmitted from the complementary component through a first uplink interval.

14. The communication method of claim 13, further comprising:
allowing the complementary component to transmit the contents for the second service to the second terminal through a second downlink interval after the first uplink interval; and
transmitting a signal transmitted from the second terminal to the complementary component through a second uplink interval adjacent to the second downlink interval.

15. The communication method of claim 13, wherein the second resource interval is a resource interval that is allocated using a time division duplex method, the first service interval is an interval in which global broadcasting contents and data communication contents are transmitted, and the first service is a global broadcasting service and a data communication service.

16. The communication method of claim 10, wherein the first resource interval is a resource interval that is allocated using a frequency division duplex method.

17. The communication method of claim 10, wherein the second service interval is an interval in which local broadcasting contents and data communication contents are transmitted, and the second service is a local broadcasting service and a data communication service.

* * * * *